United States Patent
King et al.

(10) Patent No.: US 11,725,625 B2
(45) Date of Patent: Aug. 15, 2023

(54) DISTRIBUTED REINFORCEMENT LEARNING AND CONSENSUS CONTROL OF ENERGY SYSTEMS

(71) Applicant: Alliance for Sustainable Energy, LLC, Golden, CO (US)

(72) Inventors: Jennifer Rose King, Arvada, CO (US); Paul Aaron Fleming, Boulder, CO (US); Emiliano Dall'Anese, Arvada, CO (US); Christopher Joseph Bay, Arvada, CO (US); Peter Andrew Graf, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 262 days.

(21) Appl. No.: 17/264,967

(22) PCT Filed: Jul. 31, 2019

(86) PCT No.: PCT/US2019/044522
§ 371 (c)(1),
(2) Date: Feb. 1, 2021

(87) PCT Pub. No.: WO2020/028578
PCT Pub. Date: Feb. 6, 2020

(65) Prior Publication Data
US 2021/0310461 A1    Oct. 7, 2021

Related U.S. Application Data

(60) Provisional application No. 62/842,048, filed on May 2, 2019, provisional application No. 62/712,575, filed on Jul. 31, 2018.

(51) Int. Cl.
*F03D 7/02* (2006.01)
*F03D 17/00* (2016.01)
*F03D 7/04* (2006.01)

(52) U.S. Cl.
CPC .......... *F03D 7/0204* (2013.01); *F03D 7/045* (2013.01); *F03D 7/046* (2013.01); *F03D 7/048* (2013.01);
(Continued)

(58) Field of Classification Search
CPC .......... F05B 2270/204; F05B 2260/821; F05B 2270/321; F03D 7/045; F03D 7/046; F03D 7/048
See application file for complete search history.

(56) References Cited

U.S. PATENT DOCUMENTS 8,267,655 B2    9/2012    Loh et al.
8,352,091 B2    1/2013    Haugh
(Continued)

FOREIGN PATENT DOCUMENTS

| CN | 102682207 A | * | 9/2012 | ............. G06F 19/00 |
| CN | 101930486 B | * | 10/2012 | ............. G06F 17/50 |

(Continued)

OTHER PUBLICATIONS

Extended European Search Report for European Application No. 19843068.8, dated Mar. 25, 2022, pp. 1-9.
(Continued)

*Primary Examiner* — Ronald D Hartman, Jr.
(74) *Attorney, Agent, or Firm* — Alexandra M. Hall; Robert G. Pittelkow

(57) ABSTRACT

Disclosed herein are methods, systems, and devices for utilizing distributed reinforcement learning and consensus control to most effectively generate and utilize energy. In some embodiments, individual turbines within a wind farm may communicate to reach a consensus as to the desired yaw angle based on the wind conditions.

8 Claims, 17 Drawing Sheets

(52) U.S. Cl.
CPC ........ *F03D 17/00* (2016.05); *F05B 2260/821* (2013.01); *F05B 2270/204* (2020.08); *F05B 2270/321* (2013.01); *F05B 2270/326* (2013.01)

(56) References Cited

U.S. PATENT DOCUMENTS

| | | | |
|---|---|---|---|
| 8,396,984 B2 | 3/2013 | Van Datta et al. | |
| 9,373,960 B2 | 6/2016 | Pande et al. | |
| 9,762,060 B2 | 9/2017 | Kalsi et al. | |
| 9,882,386 B2 | 1/2018 | He et al. | |
| 9,906,033 B2 | 2/2018 | Chu et al. | |
| 9,964,978 B2 | 5/2018 | Holveck et al. | |
| 10,082,778 B2 | 9/2018 | Kohn et al. | |
| 10,116,164 B2 | 10/2018 | Srivastava et al. | |
| 10,139,800 B2 | 11/2018 | Dhople et al. | |
| 10,148,092 B2 | 12/2018 | Dall'Anese et al. | |
| 2006/0173623 A1* | 8/2006 | Grzych | G01W 1/10 702/3 |
| 2012/0029720 A1 | 2/2012 | Cherian et al. | |
| 2012/0029824 A1* | 2/2012 | Wilson | G01W 1/10 702/3 |
| 2012/0185414 A1* | 7/2012 | Pyle | G01W 1/10 703/2 |
| 2013/0300115 A1 | 11/2013 | Seem et al. | |
| 2015/0101401 A1* | 4/2015 | Ekanayake | F03D 17/00 73/112.01 |
| 2015/0308416 A1* | 10/2015 | Ambekar | F03D 7/048 700/287 |
| 2015/0345474 A1* | 12/2015 | Lu | F03D 17/00 290/44 |
| 2016/0215759 A1 | 7/2016 | Fleming et al. | |
| 2017/0103468 A1 | 4/2017 | Orsini et al. | |
| 2018/0010576 A1 | 1/2018 | Brake et al. | |
| 2019/0020220 A1 | 1/2019 | Lian et al. | |
| 2019/0097427 A1 | 3/2019 | Rive et al. | |
| 2021/0115895 A1* | 4/2021 | D'Amato | F03D 7/045 |

FOREIGN PATENT DOCUMENTS

| | | | | |
|---|---|---|---|---|
| CN | 102338808 B | * | 11/2012 | ............ G01P 5/00 |
| CN | 102063796 B | | 5/2013 | |
| CN | 106979126 A | * | 7/2017 | ............ F03D 7/02 |
| EP | 2533397 A2 | | 12/2012 | |
| EP | 3057192 B1 | | 6/2015 | |
| EP | 3 406 894 A1 | | 11/2018 | |

OTHER PUBLICATIONS

English translation of Chinese Abstract for CN 101931241A, Dec. 29, 2010, 1 page.
English translation of Chinese Abstract for CN 102063796A, May 18, 2011, 1 page.
English translation of Chinese Abstract for CN 106877398A, Jun. 20, 2017, 1 page.
English translation of Russian Abstract for RU 2633407C2, Dec. 10, 2017, 1 page.
Annoni, J. et al., "Wind direction estimation using SCADA data with consensus-based optimization," Wind Energy Science, 2019, https://doi.org/10.5194/wes-4-355-2019, 14 pages.
Barreiro-Gomez, J. et al., "Data-Driven Decentralized Algorithm for Wind Farm Control with Population-Games Assistance," Energies, vol. 12, 2019, doi:10.3390/en12061164, 14 pages.
Department of Energy, Office of Electricity, "Demonstrating the Benefits of Autonomous, Decentralized Control of Microgrids," Sep. 28, 2018, 4 pages.
Eto, J. et al., "The CERTS Microgrid Concept, as Demonstrated at the CERTS/AEP Microgrid Test Bed," Energy Analysis and Environmental Impacts Division, Lawrence Berkeley National Laboratory, Sep. 2018, 53 pages.
Gionfra, N. et al., "A Distributed Consensus Control Under Disturbances for Wind Farm Power Maximization," 56th IEEE Conference on Decision and Control (CDC 2017), 2017, 9 pages.
Hamilton, T., "Managing Energy With Swarm Logic," MIT Technology Review, Feb. 4, 2009, 4 pages.
Hou, X. et al., "A Fully Decentralized Control of Grid-Connected Cascaded Inverters," IEEE Transactions on Sustainable Energy, vol. 10, No. 1, Jan. 2019, 3 pages.
Khazaei, J. et al., "Consensus Control for Energy Storage Systems," IEEE Transactions on Smart Grid, vol. 9, No. 4, Jul. 2018, 9 pages.
Li, Y., "Deep Reinforcement Learning: An Overview," https://arxiv.org/abs/arXiv:1701.07274v6, 85 pages.
Lu, S. et l., "Wind farm layout design optimization through multi-scenario decomposition with complementarity constraints," Engineering Optimization, 2014, DOI: 10.1080/0305215X.2013.861457; 26 pages.
Moretti, G. et al., "Resonant wave energy harvester based on dielectric elastomer generator," IOP Smart Materials and Structures, vol. 27, 2018, 14 pages.
International Search Report and Written Opinion for corresponding PCT/18-50, dated Oct. 25, 2019, 7 pages.

* cited by examiner

US 11,725,625 B2

DISTRIBUTED REINFORCEMENT LEARNING AND CONSENSUS CONTROL OF ENERGY SYSTEMS

CROSS-REFERENCE TO RELATED APPLICATIONS

This application claims the benefit of U.S. Provisional Application No. 62/712,575 titled "CONSENSUS-BASED WINDFARM CONTROL" and filed on Jul. 31, 2018 and U.S. Provisional Application No. 62/842,048 titled "DISTRIBUTED REINFORCEMENT LEARNING FOR CONTROL OF LARGE-SCALE ENERGY SYSTEMS" filed on May 2, 2019, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Wind turbines in a wind farm typically operate individually, controlling their own yaw direction and other operating parameters, to maximize their own performance and do not take into account information from nearby turbines. Wind turbine yaw controllers use nacelle-based wind measurements to determine local wind direction and align the turbine to the flow direction. Yaw controllers observe wind direction continuously while in a fixed nacelle position, then when a persistent or large enough error is detected, move to a new location and then stay fixed there until the next correction is commanded.

SUMMARY

An aspect of the present disclosure is a device comprising at least one processor configured to receive a wind measurement that represents a characteristic of wind as measured at a first wind turbine, receive one or more wind measurement estimates that each represent an estimate of the wind measurement as determined from the perspective of a respective second wind turbine, determine, based on the wind measurement and the one or more wind measurement estimates, using an augmented Lagrangian method, a consensus wind estimate, and adjust an operating parameter of the first wind turbine based on the consensus wind estimate. In some embodiments, the augmented Lagrangian methods comprise alternating direction method of multipliers (ADMM) methods. In some embodiments, wherein determining the consensus wind estimate comprises receiving predictions of a first local wind measurement estimate, the predictions of the first local wind measurement estimate representing respective predictions of a local wind measurement for the first wind turbine as determined from the perspective of each respective second wind turbine, receiving one or more second comparison estimates each representing, from the perspective of the respective second wind turbine, an amount of offset based on a respective previous value of a second local wind measurement estimate representing a local wind measurement estimate for the respective second wind turbine from the perspective of the respective second wind turbine and a respective one of the predictions of the first local wind measurement estimate, determining a first updated local wind measurement estimate based on the wind measurement, the predictions of the first local wind measurement estimate, first comparison estimates representing an amount of offset based on the first local wind measurement estimate and a respective prediction of the second local wind measurement estimate, the respective prediction of the second local wind measurement estimate representing a local wind measurement estimate for the respective second turbine from the perspective of the first turbine, a Lagrangian penalty factor that represents a weighting of each respective second wind turbine relative to the first wind turbine, and a total number of grouped wind turbines, determining, for each respective second turbine, a respective updated second local wind measurement estimate based on, the first updated local wind measurement estimate, the first comparison estimates, a respective third local wind measurement estimate, representing a local wind measurement estimate for the respective second wind turbine from the perspective of the respective second wind turbine, the one or more second comparison estimates, and determining, for each respective second turbine, a respective updated comparison estimate based on the respective first comparison estimate, the first updated local wind measurement estimate, and the respective updated second local wind measurement estimate. In some embodiments, the consensus wind estimate comprises determining the first updated local wind measurement estimate $(x_i^{m+1})$ using $$\frac{2x_{measure} - \rho \sum_{j \in N(i)} \left(-z_{ij}^m + u_{ij}^m\right)}{\rho N_{turbs} + 2}$$

wherein $x_{measure}$ represents the wind measurement, $z_{ij}^m$ represents the prediction of the first local wind measurement estimate, $u_{ij}^m$ represents a an amount of offset based on the first local wind measurement estimate and a respective prediction of the second local wind measurement estimate, the respective prediction of the second local wind measurement estimate representing a local wind measurement estimate for the respective second turbine from the perspective of the first turbine, p represents a Lagrangian penalty factor that represents a weighting of the respective second wind turbines relative to the first wind turbine, and $N_{turbs}$ represents the total number of grouped wind turbines, determining, for each respective second wind turbine, a respective updated second local wind measurement estimate $(z_{ij}^{m+1})$ using $\theta(x_i^{m+1}+u_{ij}^m)+(1-\theta)(x_j^{m+1}+u_{ji}^m)$ wherein $\theta$ represents a scaling factor, $x_i^{m+1}$ represents the first local wind measurement estimate, $u_{ij}^m$ represents the respective updated comparison estimate, $x_j^{m+1}$ represents the respective third local wind measurement estimate, and $u_{ji}^m$ represents the second comparison estimate, determining, for each respective second wind turbine, an updated respective comparison estimate $(u_{ij}^{m+1})$ using $u_{ij}^m+(x_i^{m+1}-z_{ij}^{m+1})$ wherein $u_{ij}^m$ represents the respective comparison estimate, $x_i^{m+1}$ represents the first local wind measurement estimate, and $z_{ij}^{m+1}$ represents the prediction of the first local wind measurement estimate.

An aspect of the present disclosure is a system comprising at least one processor configured to receive a wind measurement that represents a characteristic of wind as measured at a first wind turbine, receive one or more wind measurement estimates that each represent an estimate of the wind measurement as determined from the perspective of a respective second wind turbine, determine, based on the wind measurement and the one or more wind measurement estimates, using an augmented Lagrangian method, a consensus wind estimate, and adjust an operating parameter of the first wind turbine based on the consensus wind estimate. In some embodiments, the augmented Lagrangian methods comprise alternating direction method of multipliers (ADMM) methods. In some embodiments, determining the consensus wind estimate comprises receiving predictions of a first local wind measurement estimate, the predictions of the first local wind measurement estimate representing respective predictions of a local wind measurement for the first wind turbine as determined from the perspective of each respective second wind turbine, receiving one or more second comparison estimates each representing, from the perspective of the respective second wind turbine, an amount of offset based on a respective previous value of a second local wind measurement estimate representing a local wind measurement estimate for the respective second wind turbine from the perspective of the respective second wind turbine and a respective one of the predictions of the first local wind measurement estimate, determining a first updated local wind measurement estimate based on the wind measurement, the predictions of the first local wind measurement estimate, first comparison estimates representing an amount of offset based on the first local wind measurement estimate and a respective prediction of the second local wind measurement estimate, the respective prediction of the second local wind measurement estimate representing a local wind measurement estimate for the respective second turbine from the perspective of the first turbine, a Lagrangian penalty factor that represents a weighting of each respective second wind turbine relative to the first wind turbine, and a total number of grouped wind turbines, determining, for each respective second turbine, a respective updated second local wind measurement estimate based on the first updated local wind measurement estimate, the first comparison estimates, a respective third local wind measurement estimate, representing a local wind measurement estimate for the respective second wind turbine from the perspective of the respective second wind turbine, the one or more second comparison estimates, and determining, for each respective second turbine, a respective updated comparison estimate based on the respective first comparison estimate, the first updated local wind measurement estimate, and the respective updated second local wind measurement estimate. In some embodiments, determining the consensus wind estimate comprises determining the first updated local wind measurement estimate $(x_i^{m+1})$ using $$\frac{2x_{measure} - \rho \sum_{j \in N(i)} \left(-z_{ij}^m + u_{ij}^m\right)}{\rho N_{turbs} + 2}$$

wherein $x_{measure}$ represents the wind measurement, $z_{ij}^m$ represents the prediction of the first local wind measurement estimate, $u_{ij}^m$ represents a an amount of offset based on the first local wind measurement estimate and a respective prediction of the second local wind measurement estimate, the respective prediction of the second local wind measurement estimate representing a local wind measurement estimate for the respective second turbine from the perspective of the first turbine, p represents a Lagrangian penalty factor that represents a weighting of the respective second wind turbines relative to the first wind turbine, and $N_{turbs}$ represents the total number of grouped wind turbines, determining, for each respective second wind turbine, a respective updated second local wind measurement estimate $(z_{ij}^{m+1})$ using $\theta(x_i^{m+1}+u_{ij}^m)+(1-\theta)(x_j^{m+1}+u_{ji}^m)$ wherein $\theta$ represents a scaling factor, $x_i^{m+1}$ represents the first local wind measurement estimate, $u_{ji}^m$ represents the respective updated comparison estimate, $x_j^{m+1}$ represents the respective third local wind measurement estimate, and $u_{ji}^m$ represents the second comparison estimate, determining, for each respective second wind turbine, an updated respective comparison estimate $(u_{ij}^{m+1})$ using $u_{ij}^m+(x_i^{m+1}-z_{ij}^{m+1})$ wherein $u_{ij}^m$ represents the respective comparison estimate, $x_i^{m+1}$ represents the first local wind measurement estimate, and $z_{ij}^{m+1}$ represents the prediction of the first local wind measurement estimate.

As aspect of the present disclosure is a method comprising receiving a wind measurement that represents a characteristic of wind as measured at a first wind turbine, receiving one or more wind measurement estimates that each represent an estimate of the wind measurement as determined from the perspective of a respective second wind turbine, determining, based on the wind measurement and the one or more wind measurement estimates, using an augmented Lagrangian method, a consensus wind estimate, and adjusting an operating parameter of the first wind turbine based on the consensus wind estimate. In some embodiments, determining the consensus wind estimate comprises receiving predictions of a first local wind measurement estimate, the predictions of the first local wind measurement estimate representing respective predictions of a local wind measurement for the first wind turbine as determined from the perspective of each respective second wind turbine, receiving one or more second comparison estimates each representing, from the perspective of the respective second wind turbine, an amount of offset based on a respective previous value of a second local wind measurement estimate representing a local wind measurement estimate for the respective second wind turbine from the perspective of the respective second wind turbine and a respective one of the predictions of the first local wind measurement estimate, determining a first updated local wind measurement estimate based on the wind measurement, the predictions of the first local wind measurement estimate, first comparison estimates representing an amount of offset based on the first local wind measurement estimate and a respective prediction of the second local wind measurement estimate, the respective prediction of the second local wind measurement estimate representing a local wind measurement estimate for the respective second turbine from the perspective of the first turbine, a Lagrangian penalty factor that represents a weighting of each respective second wind turbine relative to the first wind turbine, and a total number of grouped wind turbines, determining, for each respective second turbine, a respective updated second local wind measurement estimate based on the first updated local wind measurement estimate, the first comparison estimates, a respective third local wind measurement estimate, representing a local wind measurement estimate for the respective second wind turbine from the perspective of the respective second wind turbine, the one or more second comparison estimates, and determining, for each respective second turbine, a respective updated comparison estimate based on the respective first comparison estimate, the first updated local wind measurement estimate, and the respective updated second local wind measurement estimate. In some embodiments, determining the consensus wind estimate comprises determining the first updated local wind measurement estimate ($x_i^{m+1}$) using $$\frac{2x_{measure} - \rho \sum_{j \in N(i)} \left(-z_{ij}^m + u_{ij}^m\right)}{\rho N_{turbs} + 2}$$

wherein $x_{measure}$ represents the wind measurement, $z_{ij}^m$ represents the prediction of the first local wind measurement estimate, $u_{ij}^m$ represents a an amount of offset based on the first local wind measurement estimate and a respective prediction of the second local wind measurement estimate, the respective prediction of the second local wind measurement estimate representing a local wind measurement estimate for the respective second turbine from the perspective of the first turbine, $\rho$ represents a Lagrangian penalty factor that represents a weighting of the respective second wind turbines relative to the first wind turbine, and $N_{turbs}$ represents the total number of grouped wind turbines, determining, for each respective second wind turbine, a respective updated second local wind measurement estimate ($z_{ij}^{m+1}$) using $\theta(x_i^{m+1}+u_{ij}^m)+(1-\theta)(x_j^{m+1}+u_{ji}^m)$ wherein $\theta$ represents a scaling factor, $x_i^{m+1}$ represents the first local wind measurement estimate, $u_{ij}^m$ represents the respective updated comparison estimate, $x_j^{m+1}$ represents the respective third local wind measurement estimate, and $u_{ji}^m$ represents the second comparison estimate, determining, for each respective second wind turbine, an updated respective comparison estimate ($u_{ij}^{m+1}$) using $u_{ij}^m+(x_i^{m+1}-z_{ij}^{m+1})$ wherein $u_{ij}^m$ represents the respective comparison estimate, $x_i^{m+1}$ represents the first local wind measurement estimate, and $z_{ij}^{m+1}$ represents the prediction of the first local wind measurement estimate.

DETAILED DESCRIPTION

Figure 1:
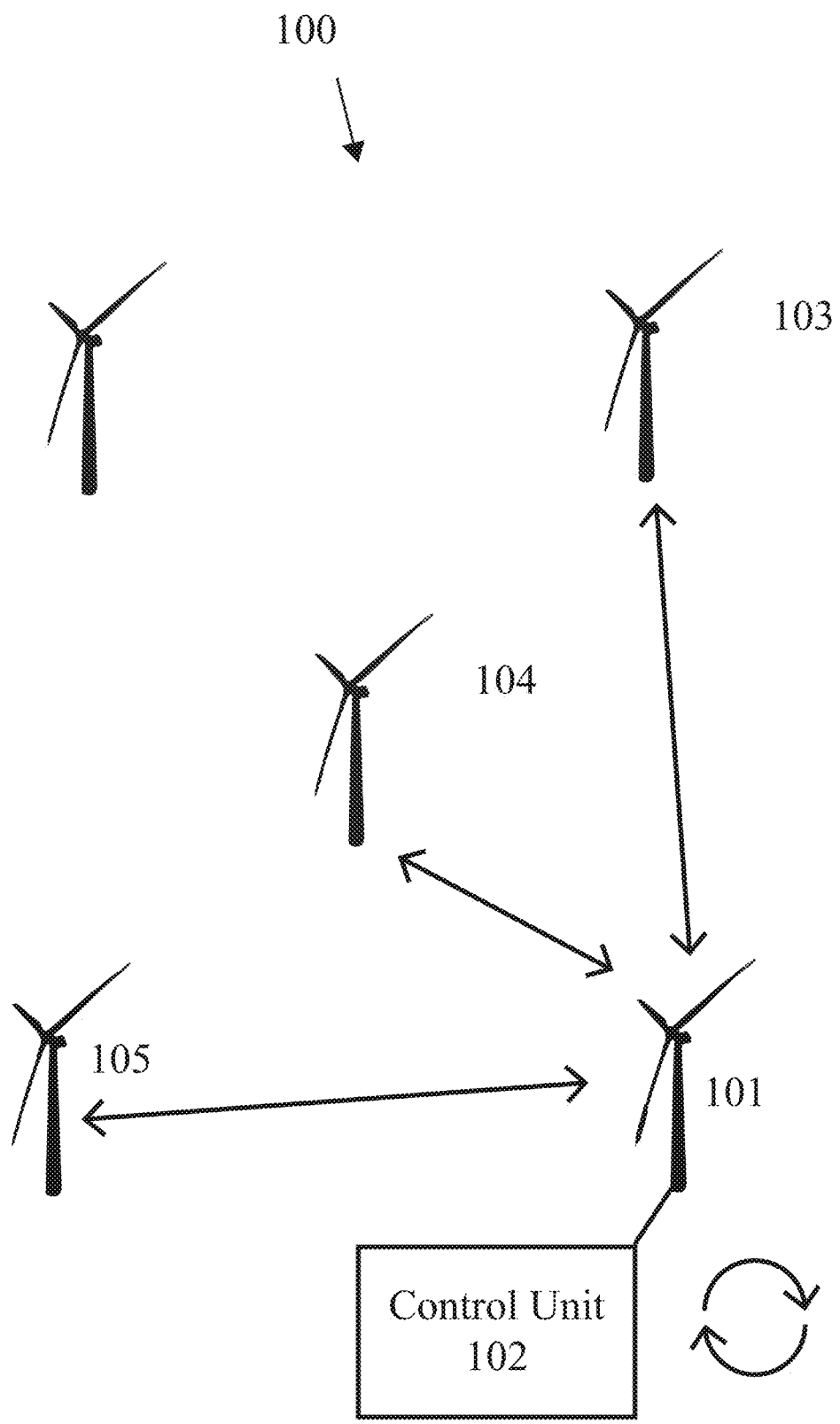
FIG. 1 is a conceptual diagram illustrating an example wind turbine control system configured to share information between wind turbines and iterate the information to reach an operating parameter consensus, in accordance with one or more aspects of the present disclosure.

The present disclosure provides systems, devices, and methods for energy system control based on consensus measurements, as well as node-to-node message passing techniques that may facilitate such control and other techniques. The present disclosure provides two example applications of the techniques, the coordinated yaw control of an entire wind farm, and the coordination ("aggregation") of demand response of water heaters. These two applications are examples of two classes of distributed control: "consensus" (the wind farm) and "sharing" (water heaters). The present disclosure provides for coordinated control of multiple semi-autonomous agents such as wind turbines and hot water heaters. This method combines reinforcement learning (RL), with alternating direction method of multipliers (ADMM), to build distributed controllers.

The present disclosure presents a new application of distributed RL combined with ADMM-RL that allows for integrating learned controllers as subsystems in generally convergent distributed control problems. Using RL, controls for highly nonlinear systems over multi-step time horizons are learned by experience, rather than directly computed on the fly by optimization. ADMM uses algorithms to solve distributed organization problems. The disclosed ADMM-RL system replaces one or more of the subproblems in ADMM with several steps of RL. When the nested iterations converge, a pre-trained subsolver is left that can potentially increase the efficiency of the deployed distributed controller by orders of magnitude. RI, can perform control-over-time for nonlinear systems that is not possible with controllers currently in use; via ADMM-RL, such control can happen in a distributed fashion, saving computational cost (and fulfilling other goals such as autonomy and privacy). Disclosed herein are methods of using ADMM-RL in both wind farm yaw control and distributed grid-aware demand aggregation for water heaters, as well as other applications.

As described herein, two or more wind direction measurements taken by individual wind turbines may be combined, and a wind farm flow field may be estimated. This flow field may then be used to provide information about the wind direction to each turbine. A consensus direction may be established, and individual turbines may use information from their neighbors to determine if the wind direction could change soon (if for example such a change was already observed by turbines upstream) or if the change it is seeing is likely transitory (because it is not consistent with the consensus).

By incorporating measurements from multiple nearby turbines, a more robust estimate of the wind direction may be obtained at an individual turbine. This estimate of the wind direction can be used to improve the turbine's knowledge of the wind direction and could have significant implications in decreasing dynamic yaw misalignment, decreasing the amount a turbine yaws due to a more robust input to the yaw controller, and resiliency to faulty wind vane measurements.

The present disclosure includes directly incorporating RL into a distributed optimization meta algorithm, such as ADMM. As described herein, wind turbines may use information from nearby wind turbines to optimize plant performance, ensure resiliency when other sensors fail, and adapt to changing local conditions. Adaptive algorithms that provide necessary information to ensure reliable, robust, and efficient operation of wind turbines in a wind plant using local sensor information. Some such information may already be collected, such as Supervisory Control and Data Acquisition (SCADA) data, local meteorological stations, nearby radars/sodars/lidars, etc. The techniques of the present disclosure present a framework for implementing an autonomous wind farm that incorporates information from local sensors in real-time or near real-time to better align turbines in a wind farm. Utilizing the methods and systems as described herein may have multiple benefits. First, by increasing yaw alignment, the power of turbines may increase. Second, by combining sensors, sensitivity to one sensor being bad may be decreased because it may be identified as biased by comparison to the consensus. Third, by reducing periods of misalignment, loads may decrease. And fourth, by avoiding un-needed yaw motions, wear-and-tear on the yaw system may decrease.

Wind turbine nacelle direction must necessarily lag changes in wind direction. The individual turbine must first observe the change in direction for a period of time to confirm its size and persistence, and then move (often at 1 deg/s). This means that, for example, if the wind direction changes 30 degrees and maintains that for the designated measurement about of time, it could be one minute before the wind turbine matches the change in direction. A single wind turbine has no way to know whether a change in direction it measures will persist or is a very short transient. A situation can occur where the wind changes 30 degrees, causing the wind turbine to yaw, only to revert to the original direction. The wind turbine would have been better served in this example staying in its location rather than chasing the wind. Additionally, often measurements made at an individual turbine are noisy and unreliable. To collect measurements of the wind conditions, turbines may rely on wind vanes and anemometers mounted on the back of the nacelle. However, these measurements are often unreliable due to the complex flow created when wind passes through the rotor, thereby preventing accurate inputs into the individual turbine yaw controller. The measurement noise may cause the turbine to yaw unnecessarily and/or cause the turbine to be misaligned. Noisy wind direction information may be addressed by mounting a forward facing lidar on the nacelle to detect the wind in front the turbine. Met towers may be used to characterize inflow. However, most turbines do not have dedicated met towers and wind direction can vary across a wind farm.

FIG. 1 is a conceptual diagram illustrating an example wind turbine control system configured to share information between wind turbines and iterate the information to reach an operating parameter consensus, in accordance with one or more aspects of the present disclosure. The wind farm 100 may include wind turbines 101, 103, 104, and 105 (i.e., the wind turbines within a subset) of the wind farm. Wind turbine 101 may be configured to take measurements of wind direction or other parameters and share those measurements with the closest other wind turbines, 103, 104, and 105 using control unit 102. Wind turbine 101 may then (using control unit 102) calculate and re-calculate (i.e., iterate) the wind direction based on the measurements received from the closest other wind turbines, 103, 104, and 105. The wind turbine 101 may then communicate the calculated wind direction to the other closest wind turbines 103, 104, and 105, and the wind turbines 101, 103, 104, and 105 may adjust their nacelles based on the calculated wind direction. Each individual wind turbine (101, 103, 104, and 105) may take its own measurements and perform the analysis as described herein.

Figure 2:
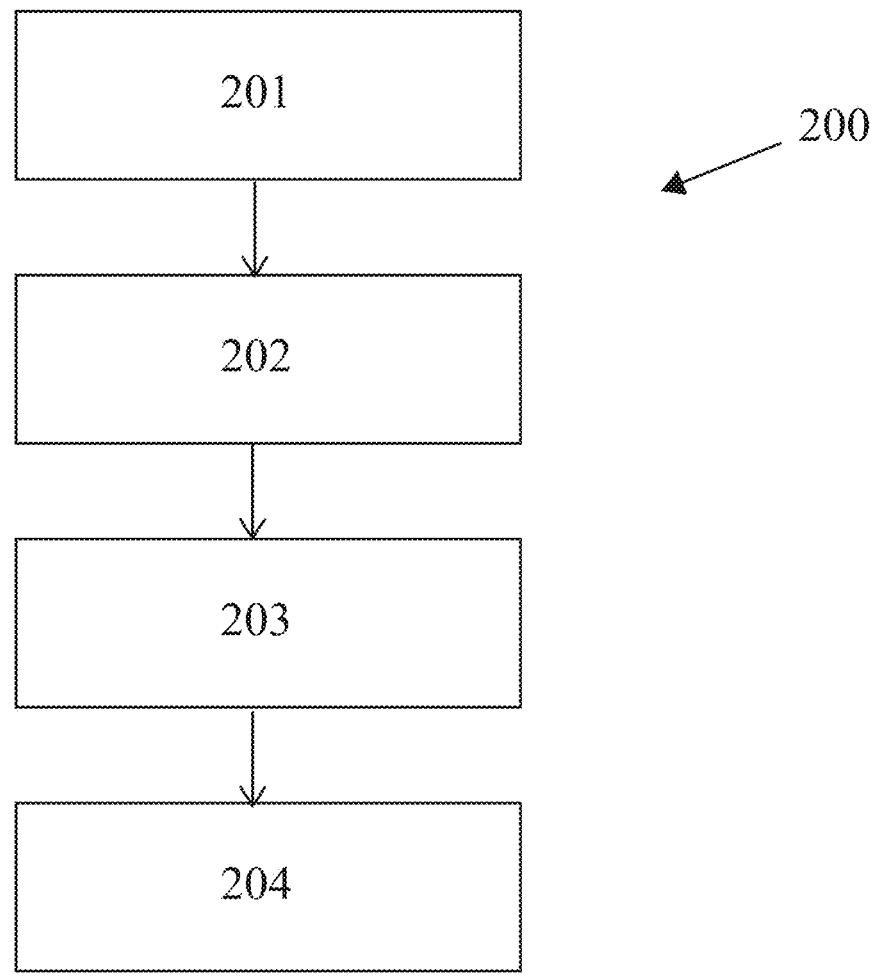
FIG. 2 is a flow diagram illustrating example operations for performing consensus control of an energy resource, in accordance with one or more aspects of the present disclosure.

FIG. 2 is a process diagram showing steps to a method according to one or more aspects of the present disclosure. The process for reaching consensus 200 begins with an individual wind turbine first taking a measurement 201. The measurement may be wind direction, temperature, wind speed, or other information valuable to the operation of the wind farm. The next step for the individual turbine is sharing the measurement and its calculated measurement 202 with other wind turbines in the wind farm. The third step for the individual turbine is receiving measurements and calculated measurements 203 from other wind turbines in the wind farm. The fourth step for the individual turbine is calculating the actual value of the measurement 204 based on the value measured at that turbine and by the values shared by other turbines. The steps of the method 200 may be performed in an iterative fashion, where the calculating may be done multiple times based on new measurements taken at that turbine and by new measurements received from other turbines. The calculating the actual value of the measurement 204 may be deemed completed when all of the turbines in the wind farm reach the same calculated actual value of the measurement.

In some embodiments, turbines may self-organize into groups, monitor their own health and the health of other turbines, and/or control/optimize their performance to maximize the economic and reliable performance of a large-scale wind plant. The present disclosure may be implemented by representing a wind farm as a network of wind turbines. Network topology may be used to advance the state-of-the-art in wind farm controls in topics ranging from distributed optimization and control to fault detection and short-term forecasting. As described herein, wind farms may take advantage of the network topology to implement scalable, reconfigurable, and resilient control strategies in real-time. The techniques described herein demonstrate a robust algorithm that takes advantage of the topology of a wind farm and incorporates local measurements from nearby turbines to determine the wind direction at an individual turbine in real-time or near real-time. Improving the wind direction measurement at the turbine may minimize unnecessary yaw movements and minimize dynamic yaw misalignments.

The present disclosure describes distributed optimization-based techniques which may be used to robustly estimate the wind direction across a wind farm. Distributed optimization and control may provide a framework for efficient computation of large systems, especially systems with complex network topologies (graph structures). However, complex aerodynamic interactions and large timescales make utilization of distributed optimization and control in the wind farm context a challenging problem. For example, a centralized optimization framework for wind farm controls has been presented in the literature but solving this problem becomes computationally complex as the system grows because of the number of turbines and larger flow domains. To address this issue, some embodiments presented herein may utilize a limited-communication distributed model predictive controller to track a power reference signal, which may use a simplified linearized wake model to describe turbine interactions, allowing for scalability.

As described herein, consensus-based algorithms may have the potential to accommodate sensor errors caused by failure, mis-calibration, and noise by assuming that turbines experience wind inflow direction that share similar characteristics with that of their neighbors. The techniques of the present disclosure use a consensus-based distributed optimization algorithm for robustly calculating wind direction at a wind turbine using SCADA data from the wind farm. This robust wind direction signal may be used as an input to a turbine yaw controller or to facilitate wake steering wind farm control. It is important to note that this approach may require no additional sensing information. This algorithm may be solved using ADMM. Additionally, the techniques described herein were demonstrated on wind farm in Oregon SCADA data wherein the wind direction varies across the wind farm. All of the data has been normalized and only a subsection of the wind farm is shown. Results of this approach are compared with meteorological towers and sodar on site and are shown below. The results indicate that this approach may provide robust measurements of the wind direction at each turbine.

In some embodiments, the method creates an autonomous wind farm that self-organizes into groups which monitor and control their performance in real-time based on existing SCADA data. Such an autonomous wind farm includes turbines configured in accordance with the techniques described herein, that may take advantage of data from nearby turbines to make more informed decisions that benefit the wind farm as a whole. This framework can be extended to include additional sensors incorporating nearby, relevant measurements from other turbines, meteorological instruments, mobile sensors, etc. Identifying a graph or network topology is important for incorporating local information and taking advantage of the structure of the wind farm to perform real-time optimization. In some embodiments, the methods and systems presented herein may determine which turbines communicate with each other. The network connections may be based on proximity, aerodynamic interactions (wakes), or other metrics and this grouping may be based on the objective of the developer/user. Some embodiments may involve solving local optimization problems and allowing for the local measurement variations that may be experienced in a wind farm.

In various embodiments, a wind farm can be modeled as an undirected or a directed network where turbines communicate with nearby turbines. Turbines in the wind farm may be considered the nodes and the edges are established communication between nearby turbines. Information may be communicated across these edges to determine local atmospheric conditions, such as wind direction or wind speed, at a particular turbine.

While turbines typically communicate with a central computer to record SCADA data, this network topology is used to determine which turbines to include while computing a local optimization at a particular turbine. The topology described in some embodiments herein is designed to take advantage of temporal and spatial structures in a wind farm. For example, a turbine on the western most edge of the wind farm may be experiencing a different wind speed/direction than a turbine on the eastern edge of the wind farm that is several kilometers away.

Figure 3:
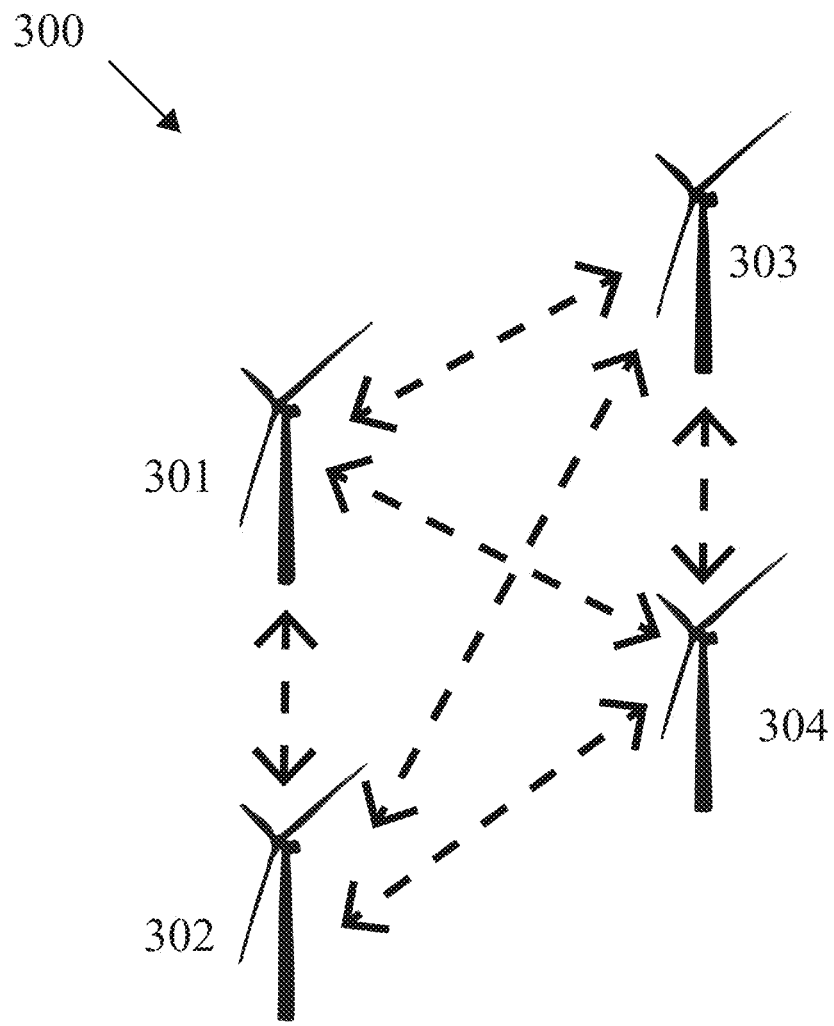
FIG. 3 illustrates an example of a 4-turbine wind farm operated as an undirected graph, in accordance with one or more aspects of the present disclosure.

An undirected network is a network in which information is exchanged in both directions along an edge. A wind farm may be modeled as an undirected graph where turbines are communicating with connected turbines and information flows both ways, rather than from one turbine to the next turbine. One example of a wind farm 300 operated as an undirected graph is shown in FIG. 3. This plot shows turbines 301, 302, 303, and 304 connected (i.e., communicating) with the nearest turbines 301, 302, 303, and 304. Modeling a wind farm 300 as an undirected network allows for relevant spatial information to be used to determine the local atmospheric conditions. The turbine interactions (i.e., wakes) may determine the network topology. Information about the upstream turbine's operation flows to the downstream turbine through the wakes. Under this paradigm, the network topology may be determined by current atmospheric conditions such as wind speed, wind direction, etc. Some embodiments described herein are based on an undirected network, while some embodiments may be based on a directed network.

Figure 4:
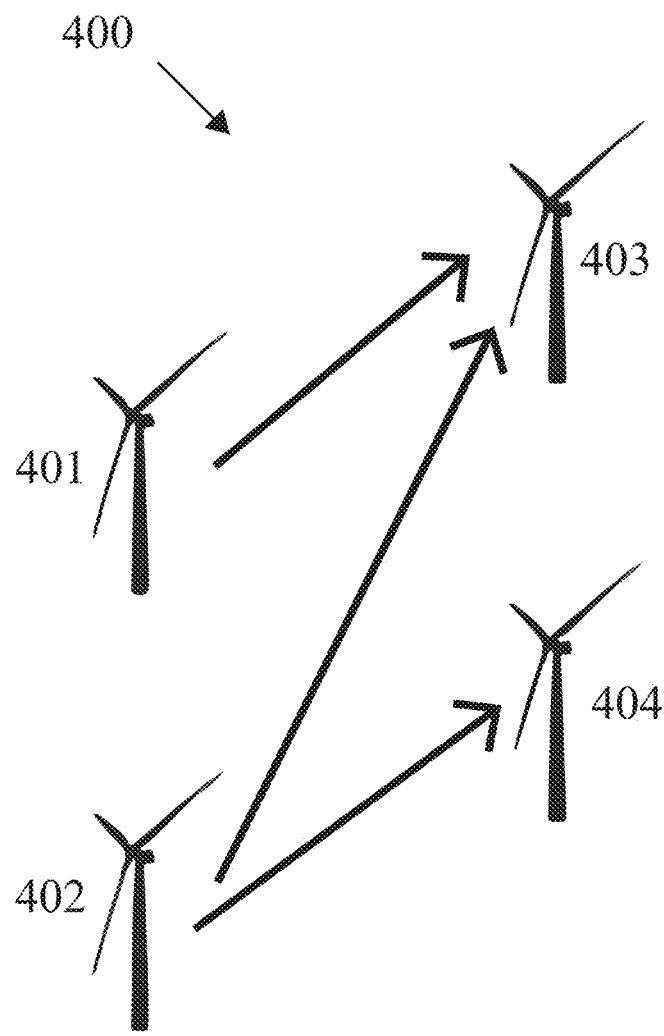
FIG. 4 illustrates an example of a 4-turbine wind farm operated as an directed graph, in accordance with one or more aspects of the present disclosure.

A directed network is a network where each edge has a direction and information flow in one direction from one node to another. A wind farm can also be modeled as a directed graph with flow in the wind farm flowing from upstream turbines to downstream turbines, as shown in the example of FIG. 4. The wind farm 400 in FIG. 4 is operated as a directed network where information from a wind turbine 401 may be shared with a wind turbine 403, but not the reverse. Similarly, in the wind farm 400 of FIG. 4, wind turbine 402 may share information with both wind turbines 403 and 404, but not receive data from either wind turbine.

The network topology is important for incorporating local information and taking advantage of the structure of the wind farm to perform real-time optimizations. There are various ways to define the graph structure in a wind farm. In some embodiments, a model-based approach may be used to determine the strength of aerodynamic interactions. In some embodiments, a data-driven approach can be used to learn the interactions between turbines. Turbine communications may be defined by the nearest X turbines. Some embodiments herein define the graph structure based on the nearest 10 turbines, but the techniques described herein may be used with graph structures defined in other ways, including alternative approaches that can be used to cluster turbines to optimally exchange information, such as connectivity, hierarchical, or k-means algorithms.

Smaller groups of turbines may agree on local conditions and may provide a robust measurement that more accurately captures the variations across the wind farm. Determining the optimal number of connections between turbines given will depend on the layout and terrain features as well as allowable computation time. The network topology chosen could facilitate short-term forecasting in a wind farm. For example, it takes minutes for wind to propagate downstream. Turbines that exist upstream could communicate to connected downstream turbines the near-term conditions including wind direction changes that could mitigate extreme loading events.

In some embodiments, using an undirected network topology, as previously described, a distributed approach may be used to solve an optimization that takes advantage of the corresponding network topology. The problem may be decomposed such that each turbine can solve their own optimization problem, which incorporates information from connected turbines in the network topology. In other words, a few measurements from nearby turbines may be used to solve an optimization rather than solving a centralized problem that includes all measurements from all turbines. Trying to incorporate all measurements from all turbines potentially poses a communication limitation as well as a computational limitation. A centralized solution could take substantial time (e.g., hours) to compute. However, grouping the wind farm into subsets provides a computationally efficient algorithm for optimizing a particular objective function. In some embodiments, the objective function can be written as:

$$\text{minimize } \Sigma_{i \in V} f_i(x_i) + \Sigma_{(j,k) \in \varepsilon} g_{jk}(x_j, x_k) \quad (1)$$

$$\text{subject to: } i=1, \ldots, N_{turbs} \, j \in \mathcal{N}(i) \quad (2)$$

where $f_i(x_i)$ is the objective function at turbine i (i.e., the node objective) $\mathcal{N}_i$ indicates the turbines connected to turbine i, $x_i$ is the wind direction estimate at turbine i, and $g_{jk}(x_j, x_k)$ compares wind direction measurements between turbines in $\mathcal{N}$ in the wind farm network (i.e., the edge objective). The objective function may be specified to improve the performance of a wind farm whether that is to maximize power, minimize loads, and/or power reference tracking, etc. Each turbine is a node in V and the nearest turbines are connected by edges in E.

In some embodiments, a consensus-based approach is described that may use the above framework to robustly determine the wind direction at every turbine. SCADA data measurements recorded at each turbine may be used to determine a robust measurement of wind direction at every turbine. This approach may allow the wind direction and wind speed to vary across a wind farm. Turbines may only communicate with a subset of nearby turbines which may allow each turbine to determine their local wind direction. It is assumed that the wind directions recorded at the turbines are with reference to true north and that the wind direction varies smoothly across the wind farm.

In some embodiments, each turbine may use their own wind direction measurement as well as the wind direction measurement from the connected turbines to determine the local wind direction. First, the objective of the individual turbine i (i.e. node objective) $f(x_i)$, may be to minimize the error between the wind direction measurement measured at turbine i and the estimated wind direction, $x_i$.

$$f(x_i) = (\tilde{x}_{i,measure} - x_i)^2 \quad (3)$$

where $x_{i,measure}$ is the wind direction measurement recorded at the turbine i. In some embodiments, the objective function may be convex and may be updated with a closed form solution. In addition to the node objective, the edge objective may incorporate information from nearby turbines to ensure a robust measurement of the wind direction at an individual turbine. The edge objective may be written as:

$$g_{jk}(x_j, x_k) = w_{jk}|x_j - x_k| \quad (4)$$

where $w_{jk}$ is a weight placed on the connection between turbines, $x_j$ is the estimated wind direction at turbine j, and $x_k$ is the estimated wind direction at turbine k. The edge objective, $g_{jk}(x_j, x_k)$, may minimize the differences in estimated wind direction between neighboring turbines. In some embodiments, the weights $w_{jk}$ may be set to 1. However, different weights may be used to indicate the "trustworthiness" of a particular measurement or to account for other considerations. In some embodiments, the weighting between turbine communications may be optimized on a case-by-case basis to better integrate the data. Equations (3) and (4) are used in Equation (1).

In some embodiments, each cluster of turbines has a fraction of the number of turbines in the wind farm and each subset can solve their own optimization problem independently. Each subset optimization may be solved in parallel, further reducing computational cost. An iterative approach may be used to solve the optimization problem.

In some embodiments, ADMM may be used to solve Equation (1). In some embodiments, an individual turbine may solve its own optimization in parallel, communicate the solution to neighboring subsets, and iterate this process until the wind farm has converged and each node has reached a single value. Each turbine may determine the local wind direction at each individual turbine by communicating only with its nearest neighbors. ADMM may be used to solve a network optimization with connecting nodes to determine a consensus between shared nodes such that:

$$\text{minimize } \Sigma_i^{N_{turbs}} f_i(x_i) + \lambda \Sigma_{(j,k) \in \varepsilon} w_{jk} \|z_{jk} - z_{kj}\|_2^2 \quad (5)$$

$$\text{subject to: } x_i = z_{ij}, \, j \in N(i) \quad (6)$$

where $z_{jk}$ is a copy of $x_j$ at turbine k such that the wind farm reaches consensus of the wind direction across the wind farm.

The distributed optimization problem may be solved using ADMM by minimizing the augmented Lagrangian:

$$L_\rho(x, z, u) = \sum_{i \in V} f_i(x_i) + \sum_{(j,k) \in \varepsilon} \lambda w_{jk} \|z_{jk} - z_{kj}\|_2^2 - \left(\frac{\rho}{2}\right)(\|u_{jk}\|_2^2 + \|u_{kj}\|_2^2) + \left(\frac{\rho}{2}\right)(\|x_j - z_{jk} + u_{jk}\|_2^2 + \|x_k - z_{kj} + u_{kj}\|_2^2)$$

where u is the scaled dual variable and $\rho > 0$ is the penalty parameter. The following steps may be used in an iterative way to solve (5):

$$x^{m+1} = \arg\min_x \mathcal{L}_\rho(x, z^m, u^m) \quad (8)$$

$$z^{m+1} = \arg\min_z \mathcal{L}_\rho(x^{m+1}, z, u^m) \quad (9)$$

$$u^{m+1} = u^m + (x^{m+1} - z^{m+1}) \quad (10)$$

where m indicates the iteration within the optimization problem. This problem is completely decomposable and may be separated based on turbines. In other words, one turbine optimization may be run on one node and may be run in parallel. This may significantly reduce computation time. The three updates, x, z, and u, may be performed according to Equations (7)-(10):

First, the x-update may be determined as:

$$x_i^{m+1} = \arg\min\left(f_i(x_i) + \sum_{j \in N(i)} \left(\frac{\rho}{2}\right)\|x_i - z_{ij}^m + u_{ij}^m\|_2^2\right) \quad (11)$$

The x update may be a convex problem and may be solved in closed form:

$$x_i^{m+1} = \frac{2x_{measure} - \rho \sum_{j \in N(i)} \left(-z_{ij}^m + u_{ij}^m\right)}{\rho N_{turbs} + 2} \quad (12)$$

If x is non-convex, then gradient-based optimization algorithms may be used to solve (11). However, there are no guarantees on convergence with this approach. In some embodiments, an extension may be utilized to address the nonconvexity of the problem to improve convergence metrics.

Next, the z-update may be calculated using:

$$z_{ij}^{m+1}, z_{ji}^{m+1} = \quad (13)$$
$$\arg\min_{z_{ij}, z_{ji}}\left(\lambda w_{ij}\|z_{ij} - z_{ji}\|_2^2 + \left(\frac{\rho}{2}\right)(\|x_i^{m+1} - z_{ij} + u_{ij}^m\|_2^2 + \|x_j^{m+1} - z_{ji} + u_{ji}^m\|_2^2)\right)$$

As with x, there is a closed form analytical solution to the z-update, for the almost consensus problem where $z_{ij} \neq z_{ji}$:

$$z_{ij}^{m+1} = \theta(x_i^{m+1} + u_{ij}^m) + (1-\theta)(x_j^{m+1} + u_{ji}^m) \quad (14)$$

$$z_{ji}^{m+1} = (1-\theta)(x_i^{m+1} + u_{ij}^m) + \theta(x_j^{m+1} + u_{ji}^m) \quad (15)$$

where $$\theta = \max\left(1 - \frac{\lambda w_{ij}}{\rho\|x_i + u_{ij} - (x_j + u_{ji})\|_2^2}, 0.5\right)$$

Finally, the u-update may be determined as:

$$u_{ij}^{m+1} = u_{ij}^m + \left(x_i^{m+1} - z_{ij}^{m+1}\right) \quad (16)$$

In addition, the user may specify a stopping criteria that is defined based on the residuals of the primal Equation (11) and dual Equation (13) problems such that $\|r^k\|_2 \leq \varepsilon^{primal}$ and $\|s^k\|_2 \leq \varepsilon^{dual}$ may be specified. This setup provides an incentive for the difference between the connected nodes to be zero. This may mean that turbines near each other may have similar wind direction measurements. There are two penalty parameters, $\lambda$ and $\rho$, that may be used to weight an individual turbine's measurement against the measurements of turbines nearby.

As demonstrated by (7)-(16), processors located at individual turbines must share various pieces of data to reach consensus. A processor located at wind turbine i will estimate the wind direction ($x_i$) at its turbine, the wind direction ($z_{ij}$) at a nearby turbine j, and a comparison between the estimated wind direction at its turbine and the wind direction at nearby turbine j ($u_{ij}$). The processor and/or control unit located at wind turbine i will then share its estimated wind direction at turbine j ($z_{ij}$) and the comparison between its estimated wind direction at its turbine and its estimated wind direction at turbine j ($u_{ij}$) with turbine j. Turbine j mirrors turbine i, calculating and sharing with turbine i. The system converges when the wind direction estimated at turbine i is approximately equivalent with the wind direction estimate turbine i calculates for turbine j (i.e., $x_i = z_{ij}$).

Figure 5:
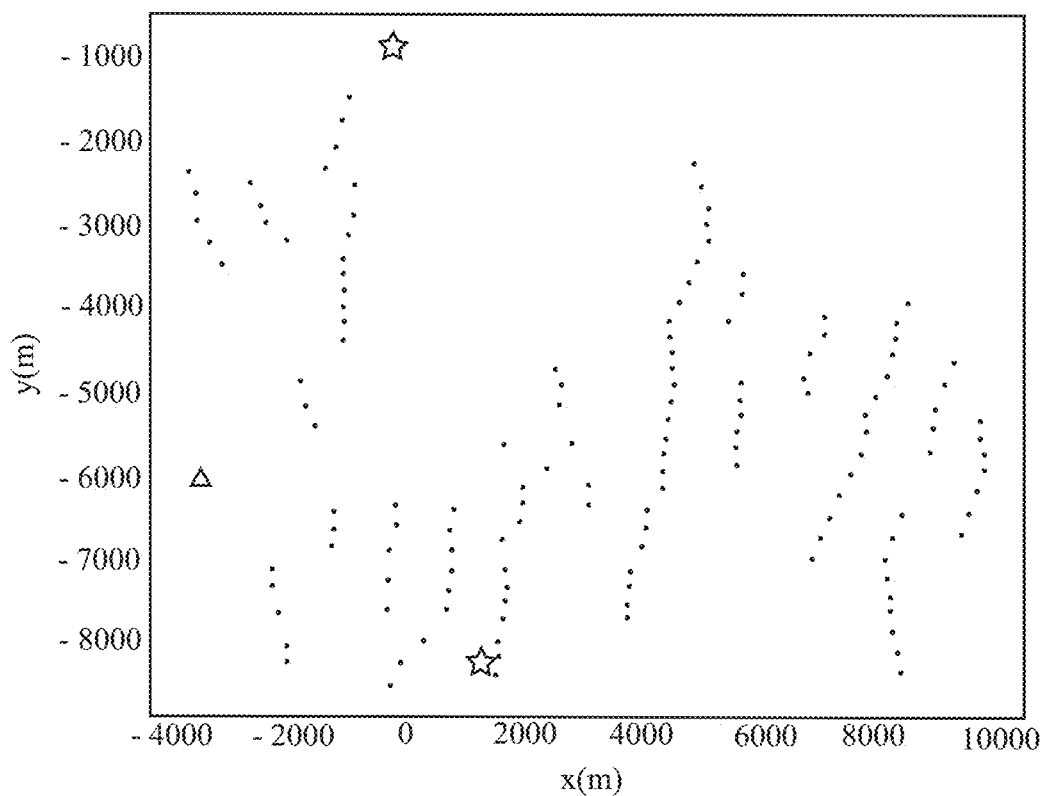
FIG. 5 illustrates the turbine locations and the instruments used in an Oregon study of some embodiments of the present disclosure.

Some of the embodiments described herein were demonstrated on a subset of wind turbines in a wind farm located in Oregon. This wind farm consists of over 200 turbines which were installed in three different phases. For this study, only a subset of the wind farm was considered, as shown in FIG. 5, over 100 turbines. The wind farm includes two met towers (indicated with stars), with sensors at 50 meters and 80 meters, and a sodar (indicated with a triangle), shown in FIG. 5. SCADA data was used at 1-minute time intervals from individual turbines over approximately 8 months. The data interest were the perceived wind direction, wind speed, and measured power at each turbine. The latitude and longitude values of each turbine were transformed into Universal Transverse Mercator (UTM) coordinates to provide approximate distances in meters between turbines. In addition, data was available for the same time period for the met towers and the sodar. The met towers had data available at 1-minute time intervals and the sodar had data available at 10-minute intervals.

Figure 6:
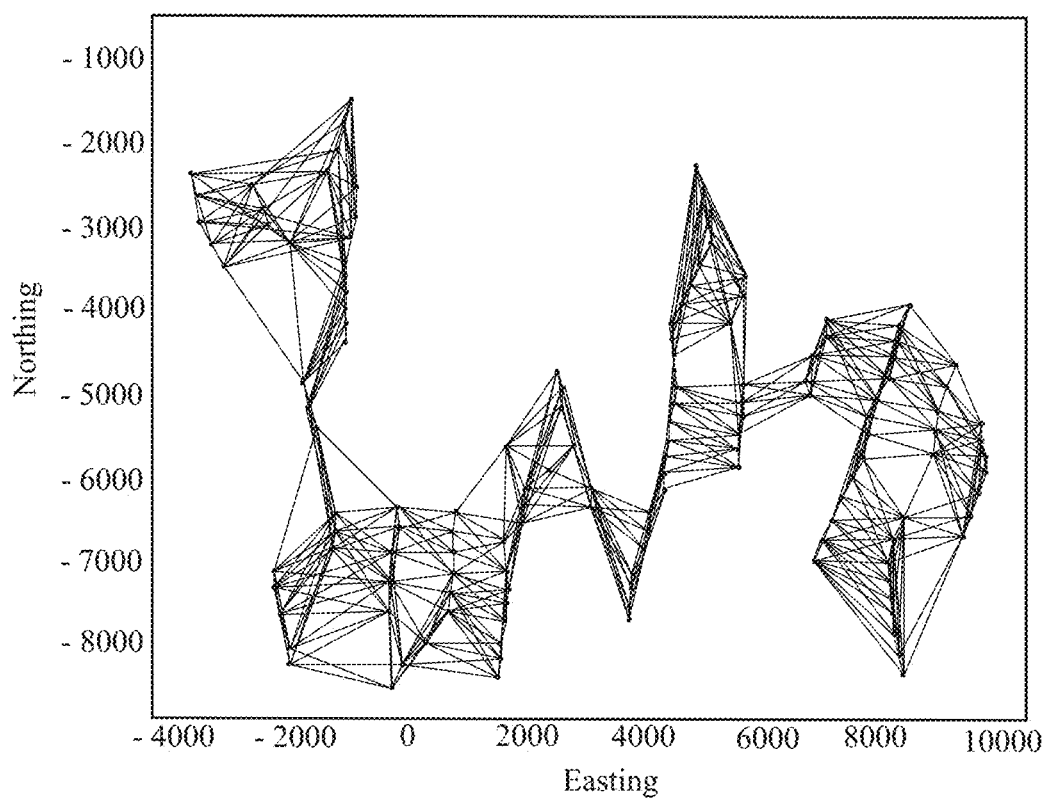
FIG. 6 illustrates groupings within the wind farm based in the Oregon study on distance from each wind turbine to its neighbors.

The network topology of the find farm in FIG. 5 was determined by connecting each turbine to the nearest 10 turbines, as shown in FIG. 6. The parameters, $\lambda$ and $\rho$ in (7) were tuned using 20 minutes of SCADA and met tower data. In particular, the SCADA data was used to interpolate the wind direction at the met tower locations and $\lambda$ and $\rho$ were used to determine the amount of consensus in the wind direction across the wind farm. These parameters indicate how much to trust connected turbine measurements with respect to the measurement from the turbine in determining the wind direction at each turbine. After tuning these parameters, 500 hours of SCADA data was analyzed and the sodar on site was used for validation.

Figure 7:
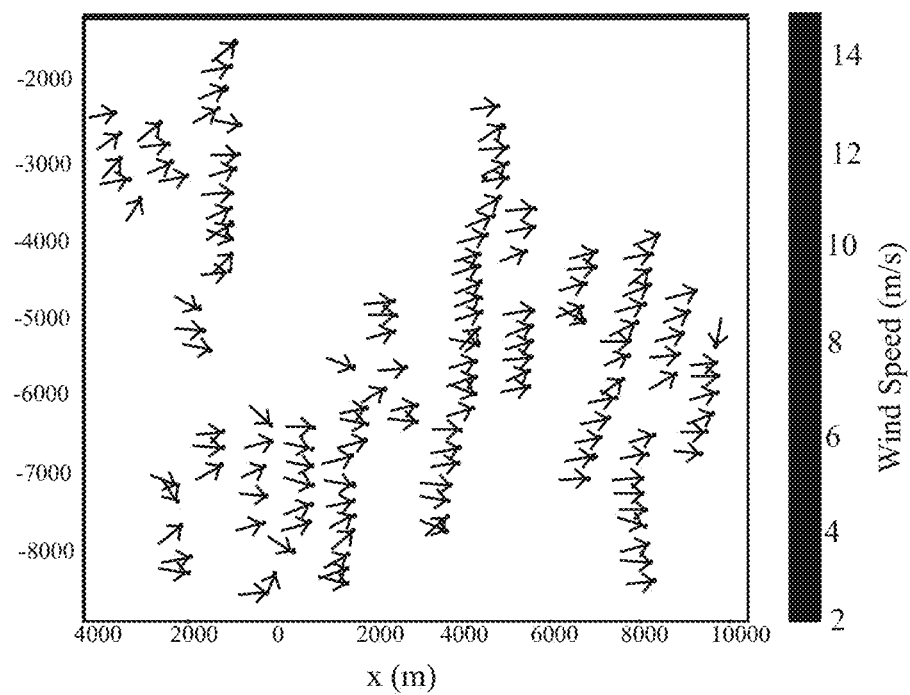
FIG. 7 illustrates the wind direction recorded at each wind turbine at one timestep across the wind farm in the Oregon study.
Figure 8:
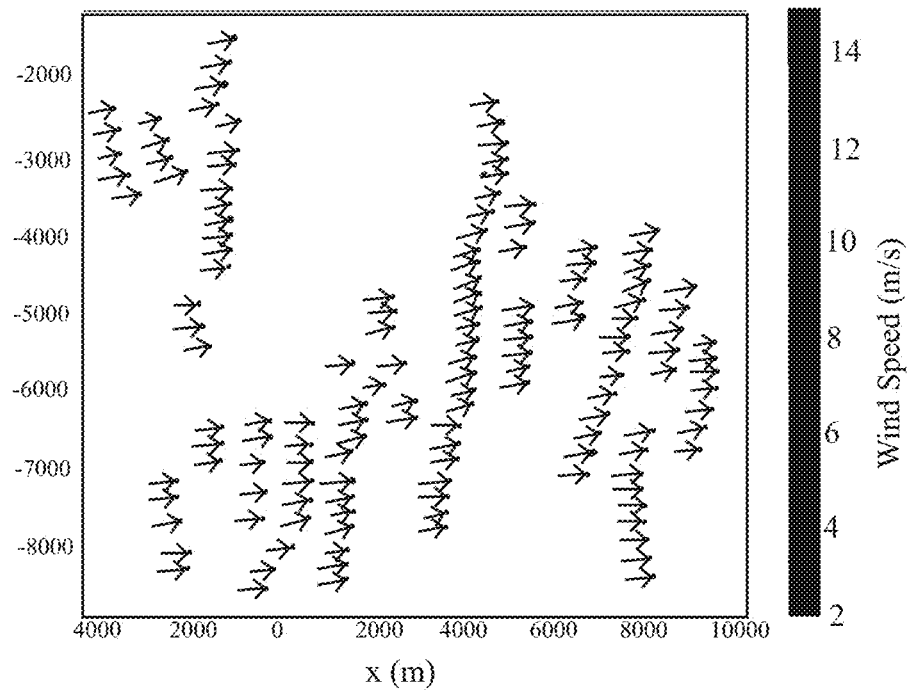
FIG. 8 illustrates the wind direction determined by some embodiments described herein using the SCADA data recorded for each wind turbine in the Oregon study.
Figure 9:
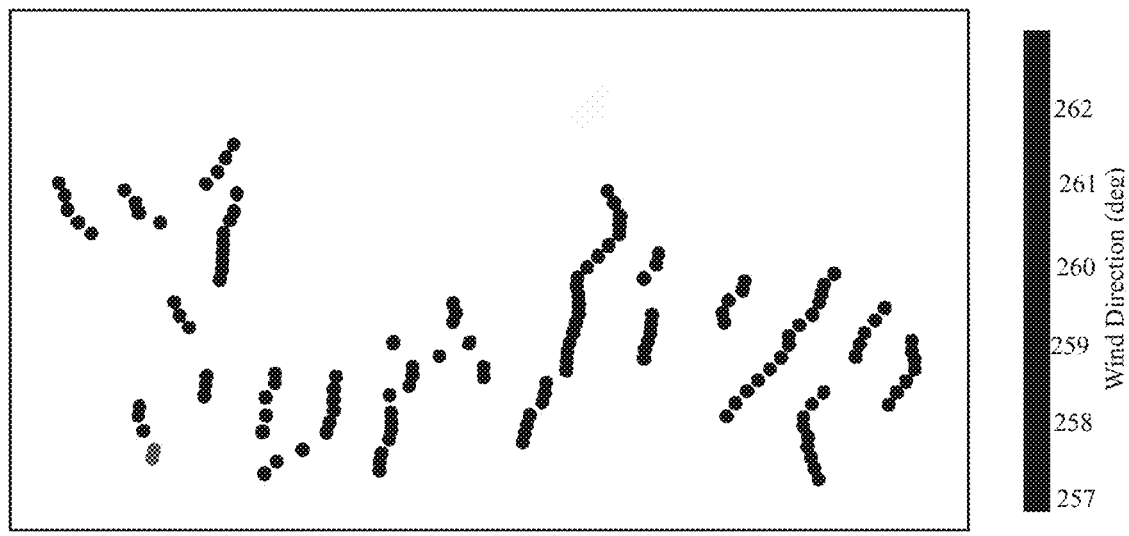
FIG. 9 illustrates the wind direction across the wind farm with the terrain, demonstrating the effects of terrain on the wind direction and how wind direction can vary across the wind farm.

In this example, the wind direction was examined at one time step with and without the consensus algorithm. FIG. 7 shows the wind direction recorded at each wind turbine for one time step. This shows the variability across the wind farm and the disagreement among turbines. FIG. 8 shows the wind direction determined from the consensus algorithm at one time step. Each timestep takes 0.5 s to compute using the described set up in Section 3. This shows a smooth wind direction across the wind farm and the algorithm allows for the wind direction to vary smoothly across the wind farm. FIG. 9 shows the terrain and the corresponding color-coded wind direction. This indicates that the wind direction varies with terrain and this algorithm is able to capture these effects even in complex terrain. In particular, a strong change in wind direction is detected near the canyon in the north-central part of the wind farm.

Figure 10:
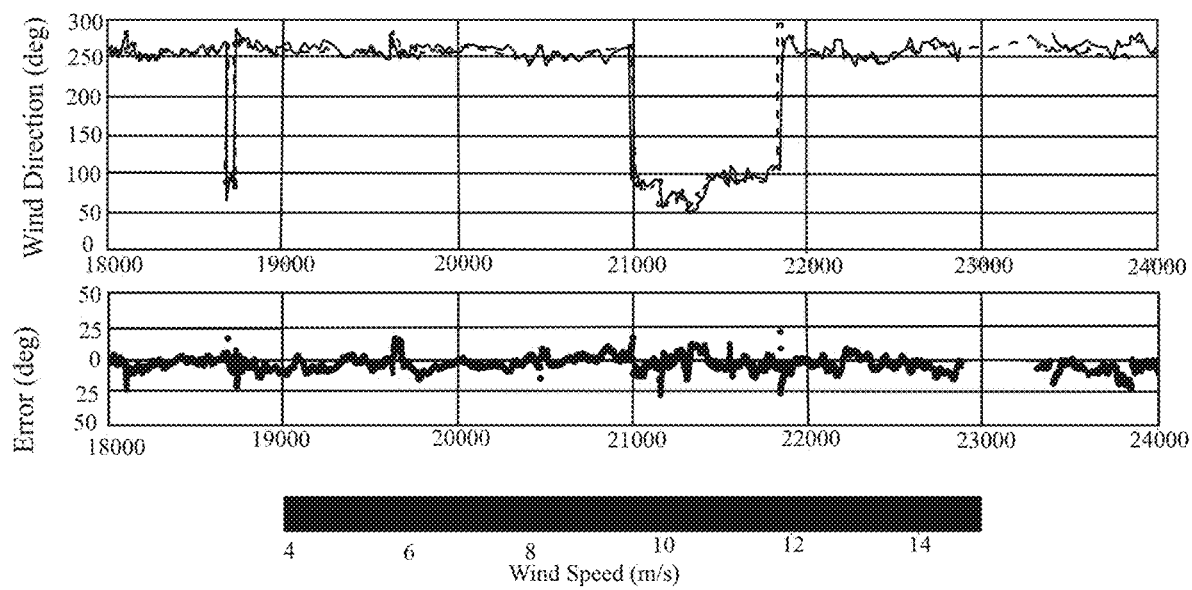
FIG. 10 shows a comparison between the estimated wind direction at the location of the sodar (dashed line) and the actual wind direction recorded by the sodar (solid line) and the error between the estimate and the actual wind direction recorded at the sodar with the actual wind speed.

Next, the results of the consensus algorithm were used to determine the wind direction at the location of the sodar on the outside of the wind farm. This was done by interpolating the wind direction based on the wind direction from the individual turbines. The results were compared with the time series data recorded by the sodar, see FIG. 10. The top plot shows the time series of the sodar in a black solid line and the estimate based on the consensus algorithm is shown as a gray dashed line. This figure shows good agreement between the estimated wind direction and the wind direction recorded at the sodar. The 100 hours shown in FIG. 10 were chosen to demonstrate the performance of the algorithm under large wind direction changes. The lower plot of FIG. 10 shows the error between the estimated and actual signal recorded by the sodar. The points are shaded with respect to wind speed. The largest errors are experienced at low wind speeds, typically at or below cut-in.

Figure 11:
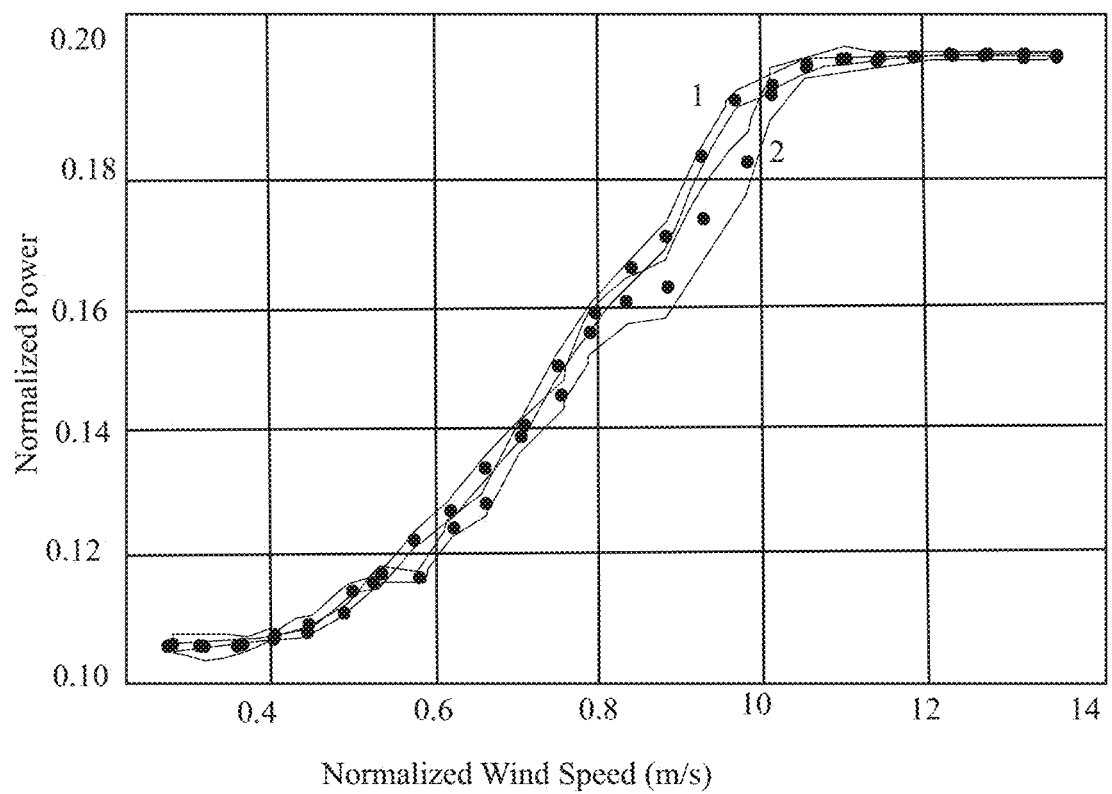
FIG. 11 shows the power curve of a single turbine computed using 0.5 m/s bins over 500 hours of data for both small yaw errors and large yaw errors.
Figure 12:
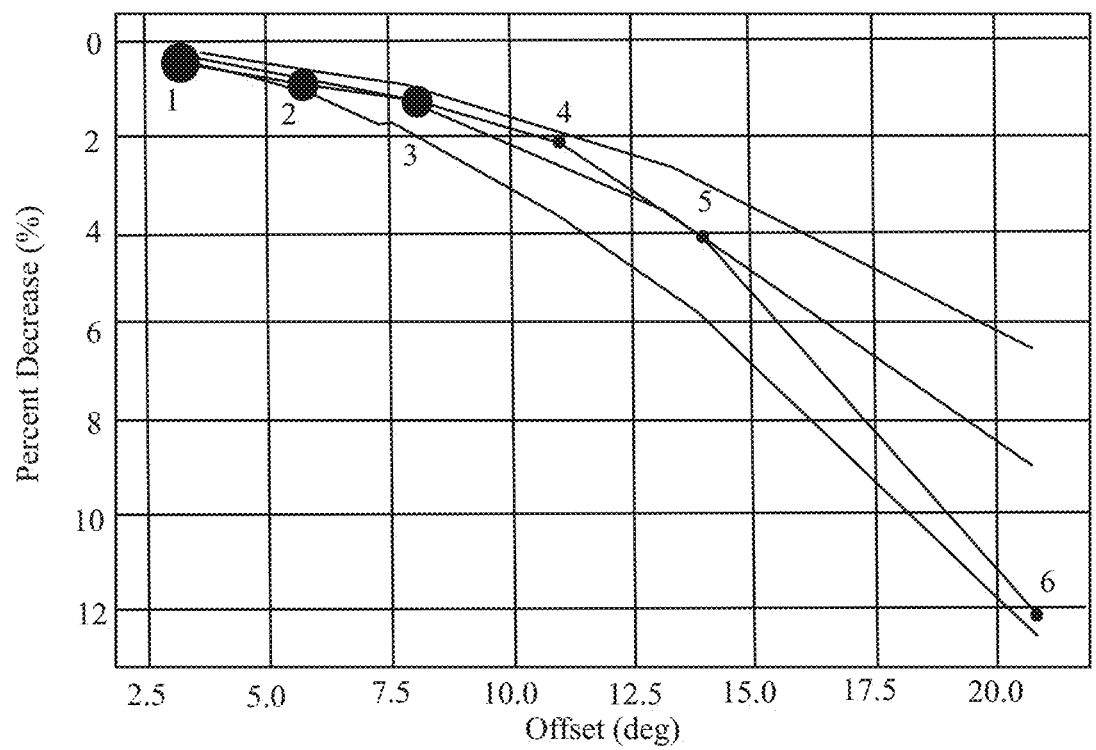
FIG. 12 shows the power loss computed for different offset angles; the trend is consistent with cosine power laws.

To demonstrate the benefits of the estimated wind direction at each turbine, the estimated wind direction was used to determine the dynamic yaw error experienced by each turbine across the wind farm. The error was calculated between the estimated wind direction and the measured wind direction at the turbine. FIG. 11 shows the power curve, computed with 95% confidence intervals, of one turbine with small yaw errors (less than 1°) as line 1 and large yaw errors (greater than 10°) as line 2. Using the estimated wind direction can identify when turbines are operating in misaligned conditions. Next, the average power loss of a turbine was computed for different amounts of yaw error using a yaw error of less than 1° as the baseline. FIG. 12 shows the results of the average data, across all turbines across 500 hours. The amount of data used to compute the power loss at each offset it shown. This plot indicates that the turbines across the wind farm spend a significant amount of time misaligned. It is important to note that there is not a lot of data for yaw errors larger than 20°. It has been shown that turbines operating in yaw misalignment have a loss of power that is proportional to $\cos(\theta)^{\rho_P}$, where $\theta$ is the misalignment angle and $\rho_P$ is determined empirically. The value of $\rho_P$ has been shown to be between 1.0 and 2.0. In FIG. 12, the data most close closely follows a $\cos(\theta)^{1.4}$. The loss in power is consistent with literature, which again indicates that the estimated wind direction is a reasonable measurement of the wind direction at each turbine. Point 1 corresponds to 48.5% of points, 2 corresponds to 15.9% of points, 3 corresponds to 13.6% of points, 4 corresponds to 7.2% of points, 5 corresponds to 4.8% of points, and 6 corresponds to 9.9% of points. Having a better wind direction measurement for the yaw controller of a turbine may improve yaw misalignments, reduce the amount of yawing a turbine performs, and may improve the effectiveness of wake steering.

One additional metric was used for assessing the value of the consensus algorithm. The relative power performance of the turbines was calculated as they experienced large (>20°) and small (<10°) yaw errors compared to two baselines: (1) the sodar in the wind farm and (2) the estimated wind direction from the consensus algorithm. In this analysis, we first eliminated erroneous data such as power values more than 13% over rated power and less than 0. 10-min sodar data and 1-min turbine power and nacelle position data were used and the statistics including the mean, median, and standard deviation of the power at each individual turbine based on wind speed bins of 1 m/s were calculated. An average power curve was computed for the wind turbines in this wind farm by removing data points that lay outside of two standard deviations above or below the median in each 1 m/s wind speed bin. Based on a separate analysis, it was determined that some turbines likely experienced drift in their yaw position sensors causing it to appear that they had regularly large yaw errors despite being oriented correctly into the wind. This was determined through a power curve analysis for each individual turbine. Data from turbines with consistently high, inexplicable yaw errors compared to the consensus algorithm or the sodar were removed.

Figure 13:
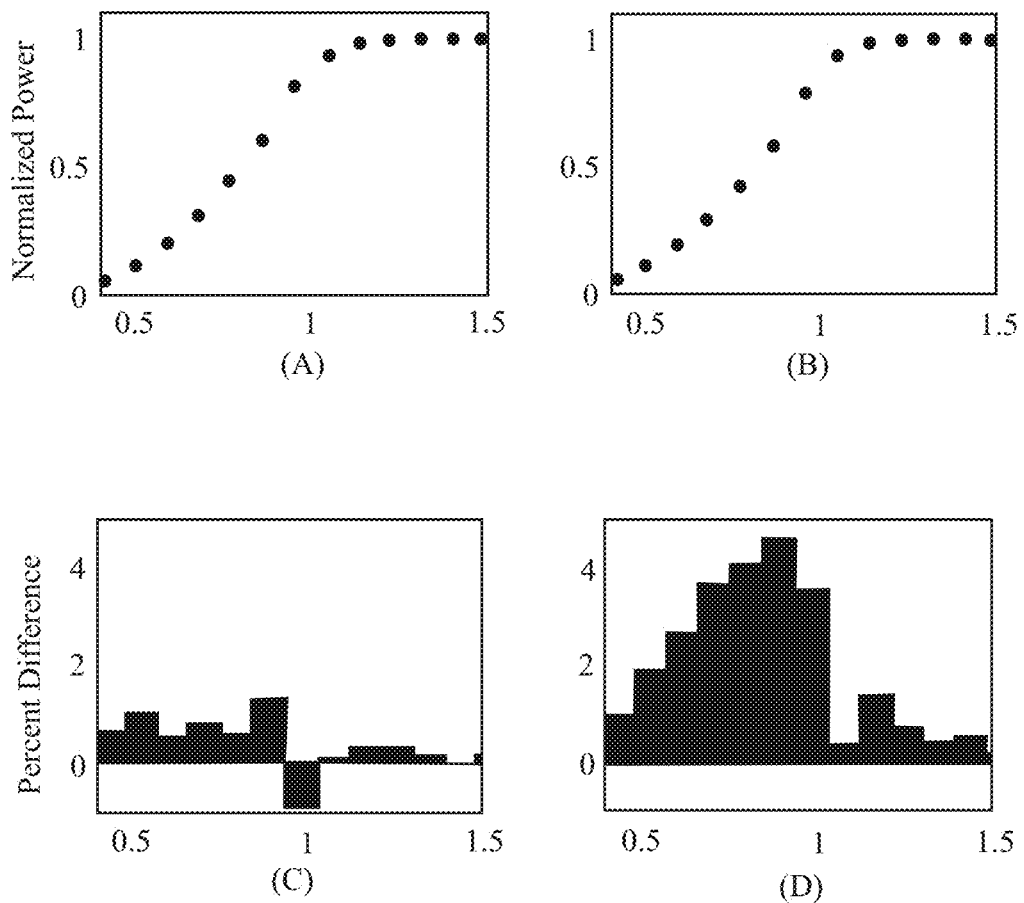
FIGS. 13A, 13B, 13C, and 13D show power curves based on binned data and percent difference between binned power from small yaw errors and large yaw errors.

FIGS. 13A, 13B, 13C, and 13D show a power curve analysis that attempts to determine the effects of yaw error on the power of a turbine. The yaw error was computed using a sodar onsite and the wind direction estimated with the proposed consensus algorithm. FIG. 13A shows the difference in the power curve analysis when a large vs. small error is detected using the sodar. FIG. 13C shows the difference between the two power curves. FIG. 13B shows the difference between the two power curves when using the wind direction estimate as a baseline. FIG. 13D shows the percent difference between the small and large yaw errors detected with the wind direction estimate. The consensus algorithm is able to approximately detect a significant decrease in power due to the dynamic yaw misalignment. Using the sodar as a baseline, there was a smaller decrease in power that was detected.

With a modified wind direction signal, it may be possible to account for these errors in real-time and improve the performance of an individual turbine by taking advantage of information at the wind farm level. Many data analysis factors impact the quantitative performance, so we do not assert any specific quantitative gains for the consensus algorithm compared to turbine wind vanes or sodar, but instead point to some qualitative differences to motivate future research. Given the data processing decisions explained in the preceding paragraphs, it appears that the consensus algorithm more closely predicts the actual yaw error across turbines than the sodar in that small errors measured with consensus result in higher mean powers for wind speed bins below rated. This result is expected since there is only one sodar in the wind farm and a significant amount of spatial variation in the wind direction, which the consensus algorithm is able to capture. This analysis indicates that by using only SCADA data in accordance with the techniques described herein, it may be possible to detect dynamic yaw misalignment.

A corrected wind direction input based on this algorithm count be used with the yaw controller, which may be able to minimize yaw misaligned conditions. Lidars have been used to date to correct for yaw misalignment. However, due to the limitations in scanning distances, lidars have only been able to correct static misalignment. The techniques described herein allow for more robust wind direction measurements that correspond to large time and space scales, which can ride-through local wind variations with small time scales and may avoid yawing prematurely.

RL is usually discussed in terms of its origins relating to the Bellman Equation and dynamic programming and formulated in terms of value functions and/or Q-functions. But herein the alternative approach of direct policy optimization is described, in particular, a linear policy was used, and it may be optimized with the Augmented Random Search (ARS) algorithm by directly minimizing the per-episode cost. The concept could easily migrate to a richer representation (e.g., neural nets) and/or more sophisticated optimization routine, but the linear policy and ARS is adequate for proof of concept of ADMM-RL. Herein, a loss function L is parameterized with parameters θ, and minimized by repeatedly running "episodes" of the simulator.

In reinforcement learning, the policy $\pi$ is a function of state, s; it is, simply, the control action $\pi(s^j)$ to take in each state, here indexed by time step j. The state depends on the problem. For the wind farm, the state is the current wind speed and direction, and the time. For water heater management, the state is the current water demand, the current water heater temperature, and the time. If the representation of the policy $\pi$ is assumed to be linear, that is, $\pi(s)=\theta^T s$, the loss is seen to be a direct function of $\theta$ $$L(\theta)=\Sigma_j^{Ntimes} c(s^j) \quad (17)$$

since given an initial state $s^0$ (and any relevant exogenous data), the sequence of states visited and thus the sequence of costs incurred is completely determined by the policy, which is a linear function of $\theta$.

Thus, the goal of learning is minimizing $L(\theta)$ w.r.t. $\theta$. The Augmented Random Search (ARS) algorithm was used to solve this equation, which can be thought of as a form of stochastic gradient descent. It probes randomly in $\theta$-space for directions that reduce the loss and adjusts the parameters $\theta$ accordingly.

Both the RL wind farm controller and the RL water heater controller are implemented within the AI-gym environment, providing an abstract interface to the ARS code and future extension to more complex models and more complex RL formulations.

A class of problems motivating ADDM and ADDM-RL are those in which independent agents are interacting in an environment where they have to balance individual goals with collective goals. These problems also happen to be ubiquitous in the field of energy systems integration, where primary functions of devices such as wind farms, water heaters, HVAC systems, electric vehicles, etc., are now being hybridized with system level goals such as stabilizing the power grid and load shifting to accommodate intermittent renewable generation.

The ADMM algorithm solves problems of the following form:

$$\text{minimize } f(x)+g(z) \quad (18a)$$

$$\text{s.t. } Ax+Bz=c \quad (18b)$$

The actual ADMM algorithm rewrites (18a) and (18b) as an unconstrained optimization problem using Lagrange multipliers (the multipliers are denoted with y or u, depending on whether they are in the "unscaled" or "scaled" formulation, respectively) and then solves the resulting minimization problem iteratively: update x with z; y fixed, update z with x; y fixed, update y with x; z fixed; repeat until convergence.

Two common problems that can be written in the above ADMM form are the so-called "consensus" and "sharing" problems. The consensus problem is applicable to any objective function that can be written in the form $$f(x)=\Sigma_i^N f_i(x) \quad (19)$$

To apply ADMM, imagine N copies of x and introduce auxiliary variable z, at which point the problem can be written $$\text{minimize } \Sigma_i f_i(x_i)$$

$$\text{s.t. } x_i=z \quad (20)$$

The usefulness of this restatement of the problem lies in the fact that a single large optimization problem is replaced with N smaller ones, and these can each be solved in parallel. The process may be iterated to self-consistency ("global consensus"); but this is frequently a worthwhile tradeoff. This is the formulation employed for the distributed wind farm yaw control problem.

The "sharing" problem of hot water heaters involves cases where x can be partitioned into subvectors $x_i$ (as opposed to consensus, above, where $x_i$ is a copy of the full x, and the function f is a sum of terms $f_i$ that only depend on $x_i$, but the overall objective contains an additional term g that is a function of all the component of $x_i$. That is, if $$\text{minimize } \Sigma_i f_i(x_i)+g(\Sigma_i x_i) \quad (21)$$

where the $x_i$ make up a partition of x, this may be "implemented" in ADMM as $$\text{minimize } \Sigma_i f_i(x_i)+g(z)$$

$$\text{s.t. } x=z \quad (22)$$

which allows for decoupling of the $x_i$ minimization problems. W.r.t. the above water heater example, the 3 ADMM updates of each iteration will involve first a minimization of $x_i$ (one for each water heater, separately and thus easily parallelizable), a single minimization over z, and a final update of the Lagrange multiplier that links x and z. These steps are detailed explicitly below.

A Gaussian profile is used to model the velocity deficit behind a turbine (this is also known as the wind turbine wake model):

$$\frac{u(x,y,z)}{U_\infty} = 1 - Ce^{-(y-\delta)^2/2\sigma_y^2} e^{-(z-z_h)^2/2\sigma_z^2} \quad (23)$$

where u is the velocity in the wake, $U_\infty$ is the free-stream velocity, x is the streamwise direction, y is the spanwise direction, $\delta$ is the wake centerline, z is the vertical direction, $z_h$ is the hub height, $\sigma_y$ is the wake expansion in the z direction, and C is the velocity deficit at the wake center. A wake deflection model is used to describe the turbine behavior in yaw misaligned conditions:

$$\alpha \approx \frac{0.3\gamma}{\cos\gamma}(1-\sqrt{\cos\gamma}) \quad (24)$$

where $\gamma$ is the yaw angle of the turbine and $C_T$ is the thrust coefficient determined by turbine operating parameters, such as blade pitch and generator torque. The initial wake deflection, $\delta_0$, is then defined as:

$$\delta_0 = x_0 \tan\alpha \quad (25)$$

where $x_0$ indicates the length of the near wake, which is typically on the order of 3 rotor diameters. The steady-state power (P) of each turbine under yaw misalignment conditions may be calculated using:

$$P = \tfrac{1}{2}\rho A C_P (\cos\gamma)^p u^3 \quad (26)$$

where $\rho$ is the air density, A is the rotor area, $C_P$ is the power coefficient derived from aerodynamic properties of the turbine, $\cos\gamma^p$ is a correction factor added to account for the effects of yaw misalignment, and p is a tunable parameter that matches the power loss caused by the yaw misalignment seen in simulations.

When looking at the impact of power on separate turbines, let $P_1$ and $P_2$ denote the power from the upstream turbine and downstream turbine, respectively. The power generated by the upstream turbine depends on the local inflow wind speed, $U_\infty$, and its yaw angle, $\gamma_1$. The power generated can be expressed using (Equation 26). Therefore, the power generated by the upstream turbine can be expressed as a function of the inflow velocity and the yaw angle, $P_1(\gamma_1)$. Because the yaw angle of the upstream turbine can be used to steer the wake into or away from the downstream turbine, the power of the second turbine is now a function of the yaw angle of the upstream turbine, $\gamma_1$. The power generated by the downstream turbine is now expressed as $P_2(\gamma_1; \gamma_2; u)$, where u is the disturbed local incoming velocity to the downstream turbine, i.e. (1)-(4). The total power generated by the two-turbine array is given by:

$$P_{tot}(\gamma, U_\infty, u) = P_1(\gamma_1 U_\infty) + P_2(\gamma, u) \tag{27}$$

where the vector $\gamma := [\gamma_1 \ \gamma_2]^T$. A similar approach can be applied for an N-turbine array, where the power of each turbine can be written as $P_i(\gamma)$, where $\gamma$ consists of yaw angles of all upstream turbines.

For small wind farms, optimization of the turbine array power $P_{tot}$ w.r.t. the yaw angles $\gamma$ can be computed in real-time and adapt to changing atmospheric conditions. However, as wind farms increase in size, other computationally efficient algorithms are needed to perform real-time optimization and control.

Additionally, in this example the focus was with yaw control over time, i.e., the primary objective function is total power production over some number of time steps. These could be over the 15-minute intervals that are typical temporal resolution of yaw controllers, or they could be an arbitrary division of time into different periods (such as 25, 20, 10, and/or 5 minute intervals). Here, the notion is kept abstract. This is a difficult problem for traditional control methods because it is nonlinear. For a linear system, the state as a function of time can be analytically described, thus participate in linear constraints and objectives that involve all time steps together. The approach to nonlinear control over time is Model Predictive Control (MPC). In MPC, linearized systems are solved exactly over time to determine the single next control action. Then the state is advanced according to the actual nonlinear dynamics, and the process repeats. A serious difficulty, beyond the linearization of the real model, is when the linearization significantly diverges from the nonlinear reality. In this case even MPC can be ineffective. One of the theoretical benefits of RL is that the training, and thus the learning, occurs on the exact nonlinear model, so RL may help close the performance gap between linear and nonlinear models.

The wind farm yaw control problem described above becomes a consensus problem if the set of turbines are partitioned into disjoint groups. The intuition surrounding the partitioning is that depending on wind direction, there is a natural partitioning into groups of turbines whose wakes affect each other strongly, with less strong wake interaction between groups. There is of course still a non-zero interaction between groups, so the problem is not completely decoupled. Herein, it is solved with ADMM by solving for each group independently and iterating to self-consistency. In this formulation, the ith group is responsible for controlling the ith subset of turbines; but recall that $x_i$ has values for all of the turbine yaws (it is the ith group's copy of the entire global x vector). The subset of turbines that the ith group controls is denoted as $x_{p(i)}$.

Note: In what follows, $x_i$ refers to a vector over time. Above superscript j is used to index time. To avoid using 3 indices, superscript k is used to index the ADDM iteration. The symbol $x_i^k$ is the vector whose components are the decisions at each time step. After employing several simplifications, the wind turbine yaw control global consensus problem may be written as.

$$x_i^{k+1} = \mathop{\text{argmin}}_{x_{p(i)}} f_i(x_i) + y_k^{k,T}(x_i - x^{-k}) + \left|\frac{\rho}{2}\right| \|x_i - x^{-k}\|^2 \tag{28a}$$

$$y^{k+1} = y^k + \rho(x_i^{k+1} - x^{-k+1}) \tag{28b}$$

Here, y is a Lagrange multiplier that enforces the global consensus, and $\rho$ is the Lagrangian penalty parameter. Overbars (e.g. $\bar{x}$) indicate averages over all the wind turbines (e.g., $1/N \ \Sigma_i x_i$). Note that as currently formulated (and implemented) the method may require an aggregator of information to gather all the $x_i$ vectors and compute and redistribute $\bar{x}$, and thus may not fully distributed. However, the "expensive" minimization of $f(x_i)$ can be distributed, and the communication of the full $x_i$ vectors is minimal by comparison.

The use of RI, via the notation "argmin-RL(n)" was used, where n is the number of "inner iteration" of ARS performed for each "outer iteration" of the ADMM algorithm.

Rewriting the above steps with RL replacing the first step, the steps of ADMM-RL for the wind farm problem are $$x_i^{k+1} = \mathop{\text{argmin} - RL(n)}_{x_{p(i)}} f_i(x_i) + y_k^{k,T}(x_i - x^{-k}) + \frac{\rho}{2}\|x_i - x^{-k}\|_2^2 \tag{29a}$$

$$y^{k+1} = y^k + \rho(x_i^{k+1} - x^{-k+1}) \tag{29b}$$

Again, a full optimization argmin is replaced with a partial optimization argmin-RL(n). But there are two benefits. First, as discussed above, and as is the case for the wind farm problem, the original argmin may be requesting to solve a problem for which no solver exists (i.e. for "overtime" solutions of nonlinear models such as the wind farm). Second, once the ADMM-RL algorithm converges, the resulting learned policy can replace the argmin-RL(n); the x update is provided simply by looking up the already-learned x values for the current state.

Figure 14:
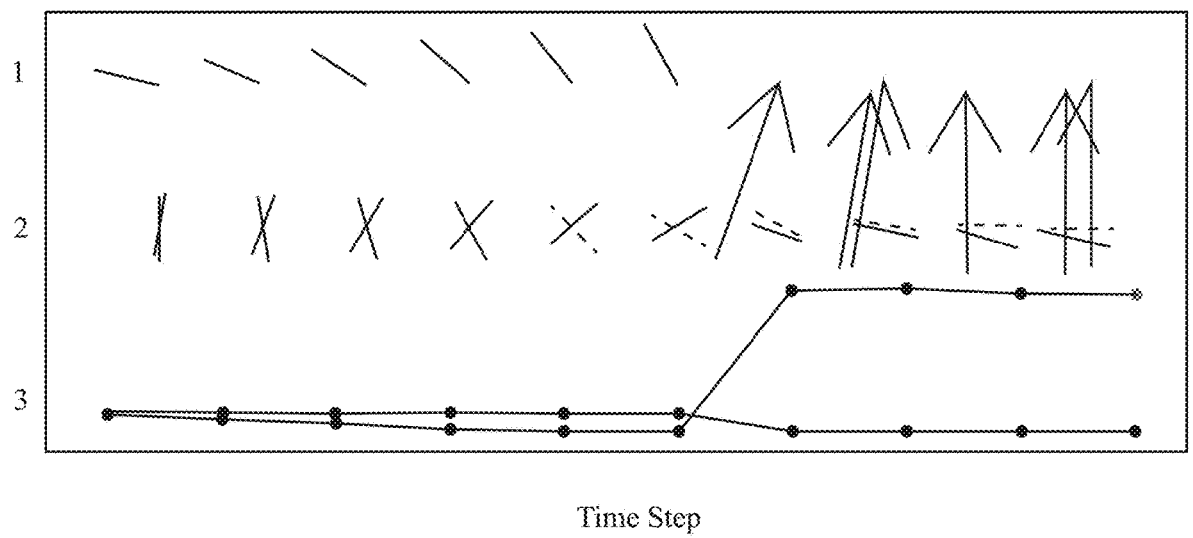
FIG. 14 shows the wind speed and direction, yaw control, and power generated.

FIG. 14 shows "Tricking floris" with the wind direction 1, yaw 2, and power 3. The arrows indicate the speed and direction of the wind over time. In the power 3 section, some methods described herein are shown with a dashed line while traditional methods (such as floris) are shown with w solid line. With limited yaw control range per time step, RL (gray line) ignores the progressively more northerly wind, because it has learned that a stronger wind will soon blow from the south. Floris (black line) is currently unable to "plan ahead" in this fashion, so follows the wind north and misses the chance at maximum production. In 2, dotted lines indicate configuration with wind blowing from the back of the turbine, thus zero power production; again, gray lines indicate RL and black lines indicate floris. For this admittedly-unfair-to-floris test case, total power over the episode is 23.4 MW for the reinforcement learning controller, versus 4.22 MW for floris.

A single turbine was simulated in an imaginary but not unrealistic wind regime in which a relatively light wind is shifting gradually from west to north, then suddenly shifting to the south and blowing stronger. This case is problematic for tools that only optimize one step at a time. If a constraint is (realistically) imposed on how many degrees a turbine can yaw per time step, and the yaw angles are chosen to maximize the power for the current conditions, it may be seen that the gradient-based single time solutions follow the wind to the north as expected, but when the wind shifts to the south they are stuck pointing the wrong way, and subsequent production is zero. The RL controller, by contrast, because it has been trained by repeatedly attempting to control the turbine over the whole time course, learns to ignore the shift to the north in order to yaw its way to the south in time to capture the stronger south wind. FIG. 14 illustrates this story.

Figure 15:
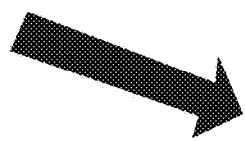
FIG. 15 illustrates a 6-turbine wind farm operated in accordance with some embodiments herein.
Figure 15:
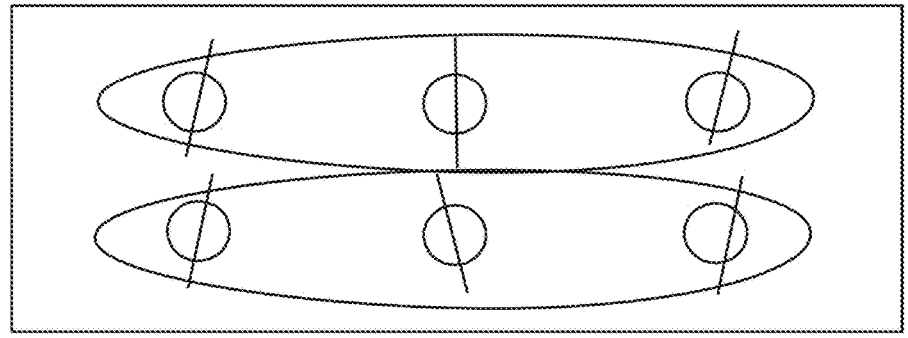

FIG. 15 shows a 6 turbine wind farm controlled using some embodiments herein. It was divided into 2 groups of 3. The arrow indicates the wind direction (at the current time; it changes during the simulation), and the straight lines indicate possible turbine yaw angles.

As a simple test of ADMM, the configuration depicted by FIG. 15 was set up. First, floris was run with no constraint on the yaw angle change per time step, which represents an upper bound on the possible power production, because the turbines are free to yaw optimally for the current conditions. Next, floris was run including a constraint that yaw angle cannot change more than 10 degrees per step. Next, RL was run in a central formulation (that is, all 6 turbines in one group; ADMM is not involved). Finally, ADDM-RL was run for the 2 groups of 3 turbines. Both RL cases also apply the same 10 degree yaw limit per time step. In this case the wind speed is constant, and the wind direction sweeps from 0 to 25 degrees and back over 10 time steps. Table 1 summarizes the results. This is a case where "anticipating" future wind direction changes is not a factor, so it is not expected to receive a better result from RL or ADMMRL.

Figure 16:
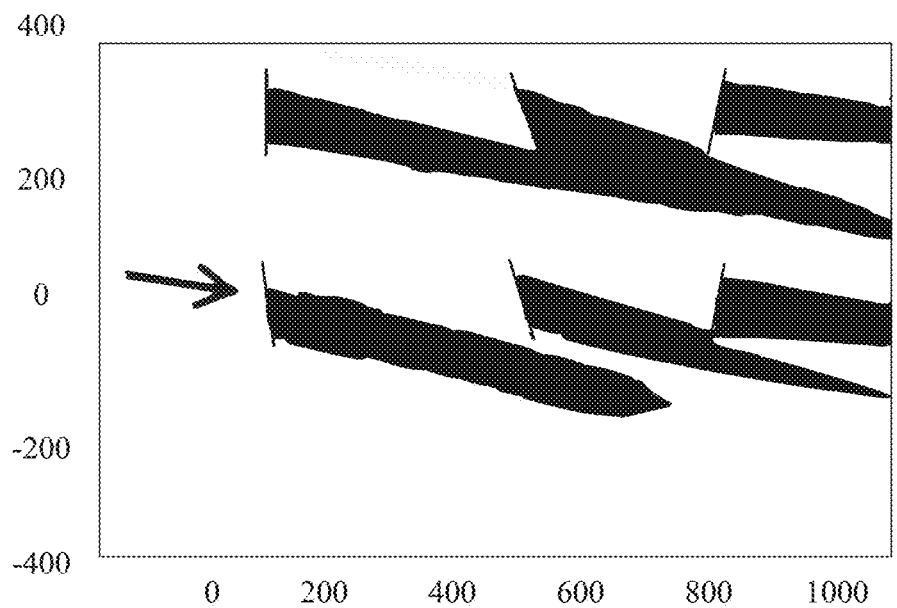
FIG. 16 illustrates a representative flow field for the 6-turbines of FIG. 15.

The point of this test is simply to demonstrate that the algorithms converge and can achieve a result comparable to the theoretically optimal result from floris. Again, though, the RL-based methods have the benefit that once learned, the control action involves no further optimization, so it can be evaluated in real time without difficulty. For illustration, a representative flow field and turbine configuration for a single time step of one of these tests is shown in FIG. 16, where the optimized yaw angles steer wakes are shown to not directly hit downwind turbines.

TABLE 1

Episode power production for the 6 turbine ("2 × 3") wind farm, for 4 methods. RL is comparable to a result achievable by the optimization-based ADMM-RL method, but the learned controller can now be operated in real time.

|  | floris Δγ ∞ | floris Δγ 10 | RL | ADMM-RL |
|---|---|---|---|---|
| Power(MW) | 81.6 | 79.0 | 78.7 | 77.5 |

FIG. 16 shows the representative flow field for the 6-turbine case of FIG. 15 (the x and y axes are spatial coordinates of the wind farm). The turbines arrange themselves in non-intuitive yaw configurations, but the visualization shows that they are doing so in order to steer their wakes away from downwind turbines. The flow fields for all the cases considered are relatively comparable to the eye.

There are many models of various demand response devices, and specifically many models of water heaters. An excellent reference, in the spirit of ADMM (but not quite the same algorithm) for the aggregation of demand response is. Real water heaters are examples of so-called "thermostatically controlled devices", which have their own interesting characteristics brought on by the combination of nonlinear physics with a "dead-band" mechanism that decouples the heating from directly responding to temperature set point changes. The model described herein, however, is linearized and simplified, and is described as follows.

The fundamental quantity in the linear water heater model without deadband is the "set point", T. The control action is "how much to increase T this time step", which is denoted x. The modeling is of a system composed of $N_{wh}$ water heaters over a time horizon (episode length) $N_{times}$. The superscript j is used to denote the time index, and subscript i to denote the water heater index. Thus set point temperature and control actions are written $T^j_i$; and $x^j_i$, respectively.

The primary function of water heater i is to avoid the "cold shower", that is, to make sure the temperature is always above a critical temperature $T_{low}$ when there is demand for hot water. The demand for hot water is an exogenous function of time, $D^j_i$. Another goal is to minimize actual cost of power used, which is assumed to be proportional to the temperature increases x. The primal cost function is the sum of these terms $$L(x_i) = \sum_j^{N_{times}} \beta L_{cs}(x_i^j) + c_{pow} x_i^j \qquad (30)$$

where $c_{pow}$ is the cost of power, and $\beta$ is the "cold shower penalty". The cold shower objective $L_{cs}$ is a conditional: if $D^j_i > 0$ and $T^j_i < T_{low}$, then $L_{cs}(x^j_i) = (T_{low} - T^j_i)$, otherwise $L_{cs}(x^j_i) = 0$. By various math programming tricks (such as linear programming or the "bigM method"), it may be encoded as a mixed integer program. In the reinforcement learning context, though, as the episode progresses it may be explicitly evaluated at the various conditions. The temperature of the linear water heater is described by a simple difference equation $$T_i^{j+1} = T_i^j + x_i^j - c_{decay} - c_{shower} D_i^j \qquad (31)$$

where $c_{decay}$ is the natural temperature drop per time step, and $c_{shower}$ is a larger constant representing the drop in temperature per unit of hot water delivered. The linear water heater model has an advantage for illustration in that it can be optimized over time with mixed integer nonlinear programming, which allows the computation, for example, of the lower bound of the cost, for comparison with approximate methods like RL.

In the water heater example, another criteria is introduced, which is that the total use of power among all the water heaters cannot exceed a time dependent supply $P^j_{max}$. This constraint is introduced as a penalty term g for consuming too much power, collectively:

$$g\left(\sum_k x_i\right) = \xi \sum_j^{N_{times}} \max\left(0, m_{pow} \sum_k x_i^j - P_{max}^j\right) \qquad (32)$$

where $P_{max}$ is a vector containing the maximum available power at each time step, $m_{pow}$ is a constant representing the amount of power used per degree of temperature increase, and $\xi$ is the strength of this penalty.

In some embodiments, the methods, systems, and devices described herein may be used to solve "sharing problems" such as those in an aggregation of water heaters.

As described above, the decision variable x describes the increase of temperature of each water heater at every time step: $x^j_i$=increase in temperature of water heater i at time j. To put it in ADMM form, partition x into $\{x_i\}$. The partitions themselves could contain more than one water heater, but as described herein, the partition is into single water heaters, i.e., each water heater is separately optimized. The two functions f and g in the sharing problem are
$f_i(x_i)$=the cold shower penalty+the cost of power
$g(\Sigma z_i)$=the collective power overuse penalty:

In scaled form, and having employed a simplification that allows replacing $z^j_i$ with $\bar{z}=1/N\Sigma_i z_i$, for each time step, the ADMM algorithm is $$x_i^{k+1} = \operatorname*{argmin}_{x} f_i(x_i) + \frac{\rho}{2}\|x_i - x_i^k + x^{-k} - z^{-k} + u^k\|_2^2 \quad (33a)$$

$$\bar{z}_{k+1} = \operatorname*{argmin}_{\bar{z}} g(N\bar{z}) + \frac{N\rho}{2}\|\bar{z} - u^k - x^{-k+1}\|_2^2 \quad (33b)$$

$$u^{k+1} = u^k + x^{-k+1} - z^{-k+1} \quad (33c)$$

where u is the scaled Lagrange multiplier, p is the augmented Lagrangian parameter, and N is the number of water heaters. Herein the fact that the collective power overuse function g, above, is actually a function of the average $x_i$, is used, thus (assuming the condition x=z is met), $$g\left(\sum_i^{N_{wh}} x_i\right) = g\left(\sum_i^{N_{wh}} z_i\right) = g(N\bar{z}) \quad (34)$$

Again, the symbol $x^k_i$ is the vector whose components are the decisions at each time step.

Especially in light of the use of direct cost-minimization to learn the policy, running several steps of ARS to improve the policy is like approximately solving the ADMM subproblems. That is, by minimizing (17) with RL, a policy $\pi(s)$ may be obtained, that, when executed from an initial state, generates a sequence of actions that constitutes approximate minimizers of (29a) or (33a). To combine ADMM and RL, then, replace one of the subproblems with some number of ARS iterations. The policy $\pi$ provides the control actions x during each episode: $x^j=\pi(s^{j-1})$. Herein RL is used for the x updates, i.e., for the changes in the yaw angles in the wind farm problem, and for the changes to the set point temperatures in the water heater problem. Note that these are the steps where the consensus variables were held fixed; the x updates are all decoupled. In this way learning myopically was employed in the targeted context of each subsystem on its own and employ formally convergent ADMM updates to achieve global convergence.

The present disclosure is the introduction and demonstration of this novel combination.

As above, the use of RL is indicated via the notation "argmin-RL(n)". Further, to simplify notation the variables were consolidated that are fixed with respect to each minimization into single variables $w^k x^k_i + x^{-k} - z^{-k} + u^k$, and $v^{k+1} = u^k + x^{-k+1}$.

Rewriting the above steps with RL replacing the first step, the steps of ADMM-RL for the cold shower problem are $$x_i^{k+1} = \operatorname*{argmin - RL(n)}_{x} f_i(x_i) + \frac{\rho}{2}\|x_i - w^k\|^2 \quad (35a)$$

$$\bar{z}_{k+1} = \operatorname*{argmin}_{\bar{z}} g(N\bar{z}) + \frac{N\rho}{2}\|\bar{z} - v^{k+1}\|^2 \quad (35b)$$

$$u^{k+1} = u^k + x^{-k+1} - z^{-k+1} \quad (35c)$$

For each outer iteration (index k), n steps were run of reinforcement learning to evolve the x values, then the z and u values were updated and the process was repeated. The z update was performed by a MINLP solver (e.g. Gurobi).

In this section we describe 2 test cases for each domain. For the wind farm, first the power of RL is illustrated (completely independent of ADMM) to optimize over time by repeated experience. Next, it is described how ADMM-RL may achieve results similar to centralized approaches. Turning to water heaters, it is first demonstrated the basic convergence, and some simple results, for a 4 water heater case. Finally, the learned RL controller is "plugged" into ADMM and see that it not only converges but is much faster than a full optimization-based ADMM approach.

Figure 17:
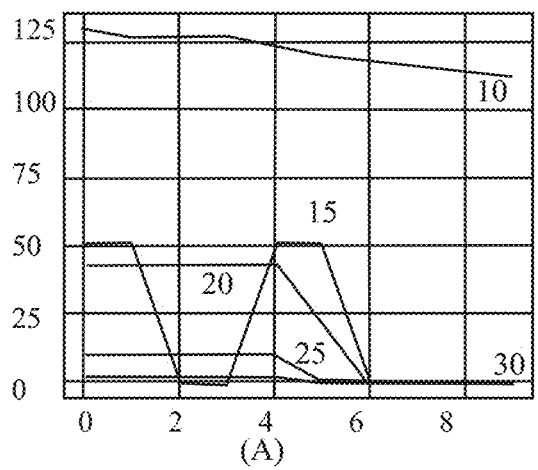
FIGS. 17A, 17B, and 17C show the trajectories found by full ADMM, ADMM-RL learning phase, and ADMM-RL operating phase for a four water heater, 10 time steps system operated in accordance with some embodiments herein.
Figure 17:
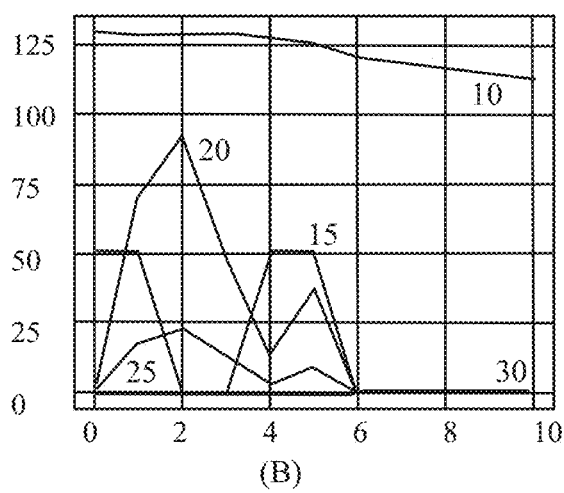
Figure 17:
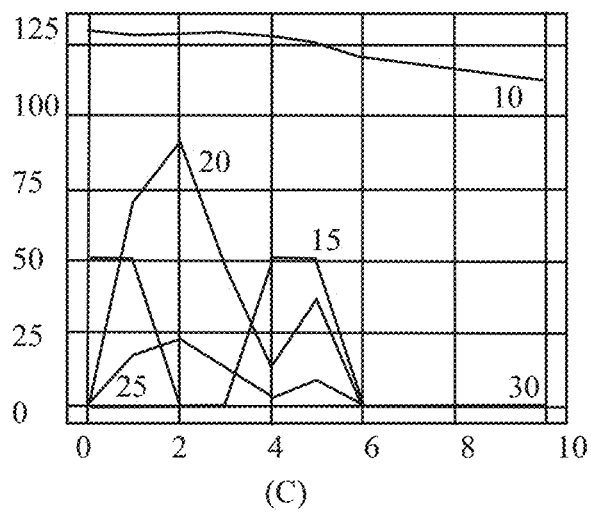

Both the full ADMM equations (33a), (33b), and (33c) and the hybrid ADMM-RL equations (35a), (35b), and (35c) were implemented for the case of 4 water heaters over episodes of 10 time steps. The problem was set up so both of these constraints are feasible, but not trivially so. The power "goes out" ($P_{max}=0$) for time steps 5 and 6, yet several of the water heaters demand water during or after this time. The problem is, primarily, preventing cold showers while collectively never using more power than is available. The results are promising. The experiments indicated that both ADMM and ADMMRL converge in roughly 20 iterations of (33a), (33b), (33c), (35a), (35b), and (35c), respectively. Using 50 RL steps per outer iteration, this corresponds to about 1000 episodes of the AI-gym water heater model. A comparison of the resulting trajectories for one of the water heaters is shown in FIG. 17. There is a rough similarity between the control actions chosen by RL versus full ADMM, but they are not the same. RL has not learned a zero penalty policy, but it is very close. By contrast, full ADMM, since it fully optimizes every x-update, achieves zero penalty (herein "penalty" is distinguished from the nonzero cost of the power inevitably used).

The whole point of the RL controller is that, once trained, it is used in an operational mode where potentially expensive optimizations are avoided. Here the learned RL was tested subsolver within the context of the ADMM algorithm. That is, the x-update above was treated using a fixed policy which simply returns the series of temperature increases mandated by this policy given the initial state, water demand, and "extra" exogenous (w.r.t. the x-update) information $w^k=x^k_i+x^{-k}-z^{-k}+u^k$. When this experiment was performed on the 4 water heater, 10 time step case, ADMM with a fixed x-update RL-based controller converges faster than if the x-update step was re-optimized each time. For this simple case, on a MacBook Pro, the full ADMM solver may require 24 iterations and may be completed in 7.6 seconds. Using the pretrained water heater policy, the ADMM iterations converge in 11 iterations, 2.3 seconds, indicating that indeed there is a potential for this combination to help. The right-most column of FIG. 15 shows the resulting temperature, power use, and cost trajectories, which achieve a cost comparable to the full ADMM case.

FIG. 17A shows trajectories found by full ADMM. FIG. 17B shows trajectories found by ADMM-RL during the learning phase. FIG. 17C shows trajectories found by ADMM-RL during the operating phase. FIGS. 17A, 17B, and 17C shows results for a 4 water heater, 10 time steps case (however, data for only one of the four water heaters is shown as representative for all four water heaters). The x-axis of FIGS. 17A, 17B, and 17C is time (arbitrary units) and the y-axis is temperature (the other fields have been scaled and units implicitly converted to fit the y-axis range). In FIGS. 17A, 17B, and 17C, line 10 shows temperature (° F.), line 15 shows water use (×1000) (gal/min), line 20 shows temperature (×20) (° F.), line 25 shows power use (W), and line 30 shows cost (×10) ($).

Note that as used herein, "turbine" and "wind turbine" are used interchangeably. The terms refer to a wind energy converter, or a device which converts wind kinetic energy to electrical energy.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to 1) tangible computer-readable storage media, which is non-transitory or 2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

The invention claimed is:

1. A device comprising:
   at least one processor configured to:
   receive a wind measurement that represents a characteristic of wind as measured at a first location;
   receive one or more T2 consensus wind estimates that each represents an estimate of the value of the characteristic of wind as determined from the perspective of a respective second location;
   determine, based on the wind measurement and the one or more T2 consensus wind estimates, using an augmented Lagrangian method, a T1 consensus wind estimate that represents an estimate of the value of the characteristic of wind as determined from the perspective of the first location,
   receive one or more T2 comparison factors that each represents a respective amount of offset as determined from the perspective of the respective second location, based on a previous value of the one or more T2 comparison factors and a previous value of the one or more T2 consensus wind estimates;
   determine, based on the one or more T2 comparison factors, a previous value of the T1 consensus wind estimate, and a previous value of one or more T1 comparison factors that each represents an amount of offset as determined from the perspective of the first location with respect to the respective second location;

determine the T1 consensus wind estimate based further on:
the wind measurement,
the previous value of the T1 consensus wind estimate;
the one or more T1 comparison factors;
a Lagrangian penalty factor that represents a weighing of the second location relative to the first location, and
a total number of grouped wind turbines; and
cause a wind turbine to adjust an operating parameter based on the T1 consensus wind estimate.

2. The device of claim 1, wherein the augmented Lagrangian methods comprise an alternating direction method of multipliers (ADMM) method.

3. The device of claim 1, wherein determining the T1 consensus wind estimate comprises determining $(x_i^{m+1})$ using $$\frac{2x_{measure} - \rho \Sigma_{j \in N(i)}(-z_{ij}^m + u_{ij}^m)}{\rho N_{turbs} + 2}$$

wherein:
$x_{measure}$ represents the wind measurement,
$z_{ij}^m$ represents one or more estimated T2 consensus wind estimates,
$u_{ij}^m$ represents the one or more T1 comparison factors,
$\rho$ represents the Lagrangian penalty factor, and
$N_{turbs}$ represents the total number of grouped locations,
wherein:
determining, for each respective second location, the one or more estimated T2 consensus wind estimates $(z_{ij}^m)$ comprises determining $$\theta(x_i^m + u_{ij}^{m-1}) + (1-\theta)(x_j^m + u_{ji}^{m-1})$$

wherein:
$\theta$ represents a scaling factor,
$x_i^m$ represents the previous value of the T1 consensus wind estimate,
$u_{ij}^{m-1}$ represents a previous value of the one or more T1 comparison factors,
$x_j^m$ represents the one or more T2 consensus wind estimates, and
$u_{ji}^{m-1}$ represents the one or more T2 comparison factors; and
determining, for each respective second location, the one or more T1 comparison factors $(u_{ji}^m)$ comprises determining $u_{ij}^{m-1} + (x_i^m - x_{ij}^m)$ wherein:
$u_{ij}^{m-1}$ represents the previous value of the one or more T1 comparison factors,
$x_i^m$ represents the previous value of the T1 consensus wind estimate, and
$z_{ij}^m$ represents the one or more estimated T2 consensus wind estimates.

4. A system comprising:
a plurality of consensus control devices, each comprising at least one processor, that are communicatively coupled to one another, each consensus control device in the plurality of consensus control devices being configured to:
receive, from one or more other consensus control devices in the plurality of consensus control devices, respective T2 consensus wind estimates that each represents a respective estimate of the actual wind speed as determined from the perspective of the respective location associated with each of the one or more other consensus control devices;
determine, based on the respective wind measurement and the respective T2 consensus wind estimates, using an augmented Lagrangian method, a respective T1 consensus wind estimate that represents an estimate of the characteristic of wind as determined from the perspective of the first wind turbine,
receive, from the one or more other consensus control devices, respective T2 comparison factors that each represents a respective amount of offset as determined from the perspective of the respective location associated with each of the one or more other consensus control devices, based on a previous value of the respective T2 comparison factors and a previous value of the respective T2 consensus wind estimates
determine, based on the respective T2 comparison factors, a previous value of the respective T1 consensus wind estimate, and a previous value of respective T1 comparison factors that each represents an amount of offset as determined from the perspective of the respective location with respect to the respective location associated with each of the one or more other consensus control devices, the respective T1 comparison factors; and
determine the respective T1 consensus wind estimate based further on:
the wind measurement,
the previous value of the respective T1 consensus wind estimate
the respective T1 comparison factors
a Lagrangian penalty factor that represents a weighting of the second locations relative to the first location,
a total number of consensus control devices in the plurality of consensus control devices, and
cause a respective wind turbine to adjust an operating parameter based on the respective T1 consensus wind estimate.

5. The system of claim 4, wherein the augmented Lagrangian methods comprise an alternating direction method of multipliers (ADMM) method.

6. The system of claim 4, wherein determining the T1 consensus wind estimate comprises determining $(x_i^{m+1})$ using $$\frac{2x_{measure} - \rho \Sigma_{j \in N(i)}(-z_{ij}^m + u_{ij}^m)}{\rho N_{turbs} + 2}$$

wherein:
$X_{measure}$ represents the respective wind measurement,
$z_{ij}^m$ represents the respective estimated T2 consensus wind estimates,
$u_{ij}^m$ represents the respective T1 comparison factors,
$\rho$ represents the Lagrangian penalty factor, and
$N_{turbs}$ represents the total number of consensus control devices in the plurality of consensus control devices,
wherein:

determining, for each respective one of the one or more other consensus control devices, the respective estimated T2 consensus wind estimates $z_{ij}{}^m$ comprises determining $$\theta(x_i^m + u_{ij}^{m-1}) + (1-\theta)(x_j^m + u_{ji}^{m-1})$$

wherein:
θ represents a scaling factor,
$x_i{}^m$ represents the previous value of the respective T1 consensus wind estimate,
$u_{ij}{}^{m-1}$ represents a previous value of the respective T1 comparison factors,
$x_j{}^m$ represents the respective T2 consensus wind estimates, and
$u_{ji}{}^{m-1}$ represents the respective T2 comparison factors; and,
determining, for each respective one of the one or more other consensus control devices, the respective T1 comparison factors ($u_{ij}{}^m$) comprises determining $u_{ij}{}^{m-1}+(x_i{}^m-z_{ij}{}^m)$ wherein:
$u_{ij}{}^{m-1}$ represents the previous value of the respective T1 comparison factors,
$x_i{}^m$ represents the previous value of the respective T1 consensus wind estimate, and
$z_{ij}{}^m$ represents the respective estimated T2 consensus wind estimates.

7. A method comprising:
receiving, by a consensus control device comprising at least one processor, a wind measurement that represents a value of a characteristic of wind as measured at a first location;
receiving, by the consensus control device, one or more T2 consensus wind estimates that each represents a respective estimate of the value of the characteristic of wind as determined from the perspective of a respective second location;
determining, by the consensus control device, based on the wind measurement and the one or more T2 consensus wind estimates, using an augmented Lagrangian method, a T1 consensus wind estimate that represents an estimate of the value of the characteristic of wind as determined from the perspective of the first location, and
receiving one or more T2 comparison factors that each represents a respective amount of offset as determined from the perspective of the respective second location, based on a previous value of the one or more T2 comparison factors and a previous value of the one or more T2 consensus wind estimates;
determining, based on the one or more T2 comparison factors, a previous value of the T1 consensus wind estimate, and a previous value of one of one or more T1 comparison factors that each represents an amount of offset as determined from the perspective of the first location with respect to the respective second location, the one or more T1 comparison factors; and
determining the T1 consensus wind estimate based further on:
the wind measurement,
the previous value of the T1 consensus wind estimate,
the one or more T1 comparison factors,
a Lagrangian penalty factor that represents a weighting of the second locations relative to the first location, and
a total number of grouped locations, and
causing, by the consensus control device, a wind turbine to adjust an operating based on the T1 consensus wind estimate.

8. The method of claim 7, wherein determining the T1 consensus wind estimate comprises determining $(x_i{}^{m+1})$ using $$\frac{2x_{measure} - \rho\Sigma_{j\in N(i)}(-z_{ij}^m + u_{ij}^m)}{\rho N_{turbs} + 2}$$

wherein:
$X_{measure}$ represents the wind measurement,
$x_{ij}{}^m$ represents the one or more estimated T2 consensus wind estimates,
$u_{ij}{}^m$ represents the one or more T1 comparison factors,
ρ represents the Lagrangian penalty factor, and
$N_{turbs}$ represents the total number of grouped locations,
determining, for each respective second location, the one or more estimated T2 consensus wind estimates ($z_{ij}{}^m$) comprises determining $$\theta(x_i^m + u_{ij}^{m-1}) + (1-\theta)(x_j^m + u_{ji}^{m-1})$$

wherein:
θ represents a scaling factor,
$x_i{}^m$ represents the previous value of the T1 consensus wind estimate,
$u_{ij}{}^{m-1}$ represents a previous value of the one or more T1 comparison factors,
$x_j{}^m$ represents the one or more T2 consensus wind estimates, and
$u_{ji}{}^{m-1}$ represents the one or more T2 comparison factors; and
determining, for each respective second location, the updated one or more T1 comparison factors ($u_{ij}{}^m$) comprises determining $u_{ij}{}^{m-1}+(x_i{}^m-z_{ij}{}^m)$ wherein:
$u_{ij}{}^{m-1}$ represents the previous value of the one or more T1 comparison,
$x_i{}^m$ represents the previous value of the T1 consensus wind estimate, and
$z_{ij}{}^m$ represents the one or more estimated T2 consensus wind estimates.

* * * * *